United States Patent
Sacca

(10) Patent No.: US 6,380,967 B1
(45) Date of Patent: Apr. 30, 2002

(54) SYSTEM TO CAPTURE, STORE, AND RETRIEVE COMPOSITE VIDEO FOR TRANSMISSION OVER TELEPHONE LINES

(76) Inventor: Frank Sacca, 1405 Peppertree Cir., West Covina, CA (US) 91792

( * ) Notice: Subject to any disclaimer, the term of this patent is extended or adjusted under 35 U.S.C. 154(b) by 0 days.

(21) Appl. No.: 08/762,884

(22) Filed: Dec. 7, 1996

(51) Int. Cl.⁷ ................................................ H04N 7/14
(52) U.S. Cl. ............................... 348/14.01; 348/14.04; 348/14.05
(58) Field of Search ............................ 379/53; 358/85, 358/296; 370/94.2; 360/32; 348/714, 15, 14, 17, 18, 22; 375/240, 241, 372

(56) References Cited

U.S. PATENT DOCUMENTS

| | | | |
|---|---|---|---|
| 4,325,075 A | | 4/1982 | Kashigi et al. ............... 358/13 |
| 4,715,059 A | * | 12/1987 | Cooper-Hart et al. ......... 379/53 |
| 4,857,990 A | | 8/1989 | Horgan ........................ 358/13 |
| 4,888,795 A | * | 12/1989 | Ando et al. ................... 379/53 |
| 4,932,047 A | * | 6/1990 | Emmons et al. .............. 379/53 |
| 4,943,994 A | * | 7/1990 | Ohtsuka et al. .............. 348/17 |
| 4,985,911 A | * | 1/1991 | Emmons et al. .............. 379/53 |
| 5,079,627 A | | 1/1992 | Filo ............................ 358/85 |
| 5,121,261 A | * | 6/1992 | Isogai et al. .................. 360/32 |
| 5,182,635 A | * | 1/1993 | Nakashima et al. .......... 348/17 |
| 5,257,348 A | * | 10/1993 | Roskowski et al. ......... 395/157 |
| 5,452,022 A | * | 9/1995 | Yamamoto et al. ......... 348/714 |
| 5,495,284 A | * | 2/1996 | Katz ........................... 348/15 |
| 5,502,727 A | * | 3/1996 | Catanzaro et al. ......... 370/94.2 |
| 5,550,646 A | * | 8/1996 | Hassan et al. .............. 358/442 |
| 5,568,185 A | * | 10/1996 | Yoshikazu ................... 348/22 |
| RE35,657 E | * | 11/1997 | Buckley et al. ............. 358/296 |

FOREIGN PATENT DOCUMENTS

| | | | | |
|---|---|---|---|---|
| JP | 362206690 A | * | 9/1987 | ............ G06K/9/36 |
| JP | 363185166 A | * | 7/1988 | ............ H04N/1/41 |
| JP | 401018387 A | * | 1/1989 | ............ H04N/7/18 |
| JP | 402250484 A | * | 10/1990 | ............ H04N/7/14 |
| JP | 403001647 A | * | 1/1991 | .......... H04M/11/00 |
| JP | 404145777 A | * | 5/1992 | .......... H04N/5/232 |
| JP | 408046703 A | * | 5/1992 | ............ H04M/3/56 |
| JP | 408023529 A | * | 1/1996 | ............ H04N/7/14 |

OTHER PUBLICATIONS

The Art of Digital Video, Focal Press, 1994, Watkinson, pp. 15–18.
Principles of Communication Systems, McGraw Hill, 1986, Taub et al, pp. 518–522.
The Data Compression Book, M&T Publishing, 1992, Nelson, p. 353.

* cited by examiner

Primary Examiner—Curtis Kuntz
Assistant Examiner—Melur. Ramakrishnaiah

(57) ABSTRACT

A simple, low-cost videophone system for transmitting and receiving still video images over a standard telephone line in response to a user command. A video processor circuit, comprising an A/D converter, a digital memory, a digital timing circuit, and a D/A converter, can grab a video image from a standard video camera and store one-half the number of lines of a video frame in the digital memory. A still video image can be displayed in a standard TV monitor by repeatedly sending the data stored in the digital memory to the D/A converter. The data stored in the digital memory can be transmitted using a standard modem to the digital memory of an equivalent system at a remote location, and the same still video image can be displayed at the remote location within a short time. Data compression is accomplished during transmission by decreasing the number of significant bits of the data being transmitted and using standard protocols adopted by the modem. Voice communication on the telephone line is temporarily suspended while data is transmitted, and automatically resumed when transmission is complete.

22 Claims, 11 Drawing Sheets

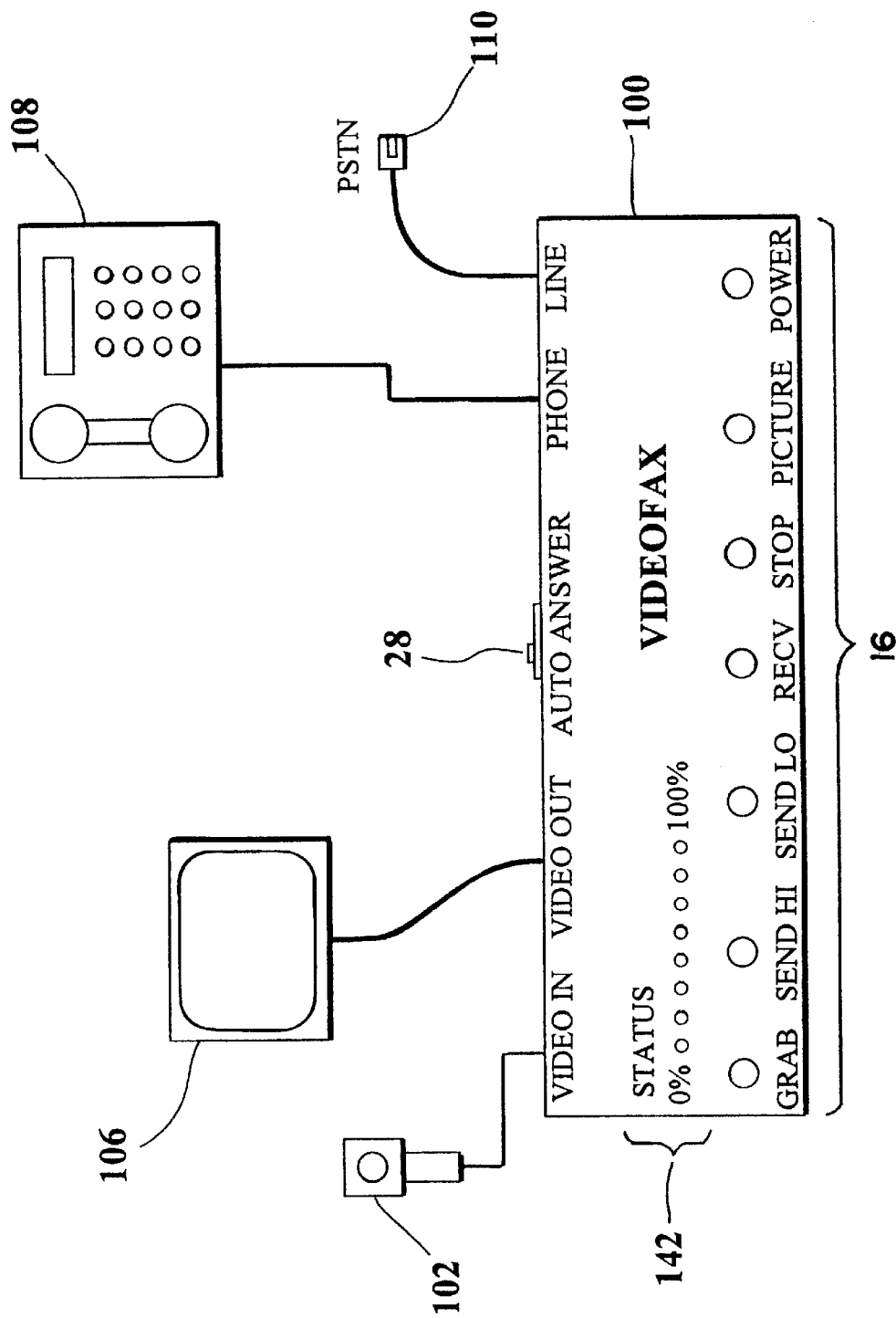
FIG. IA

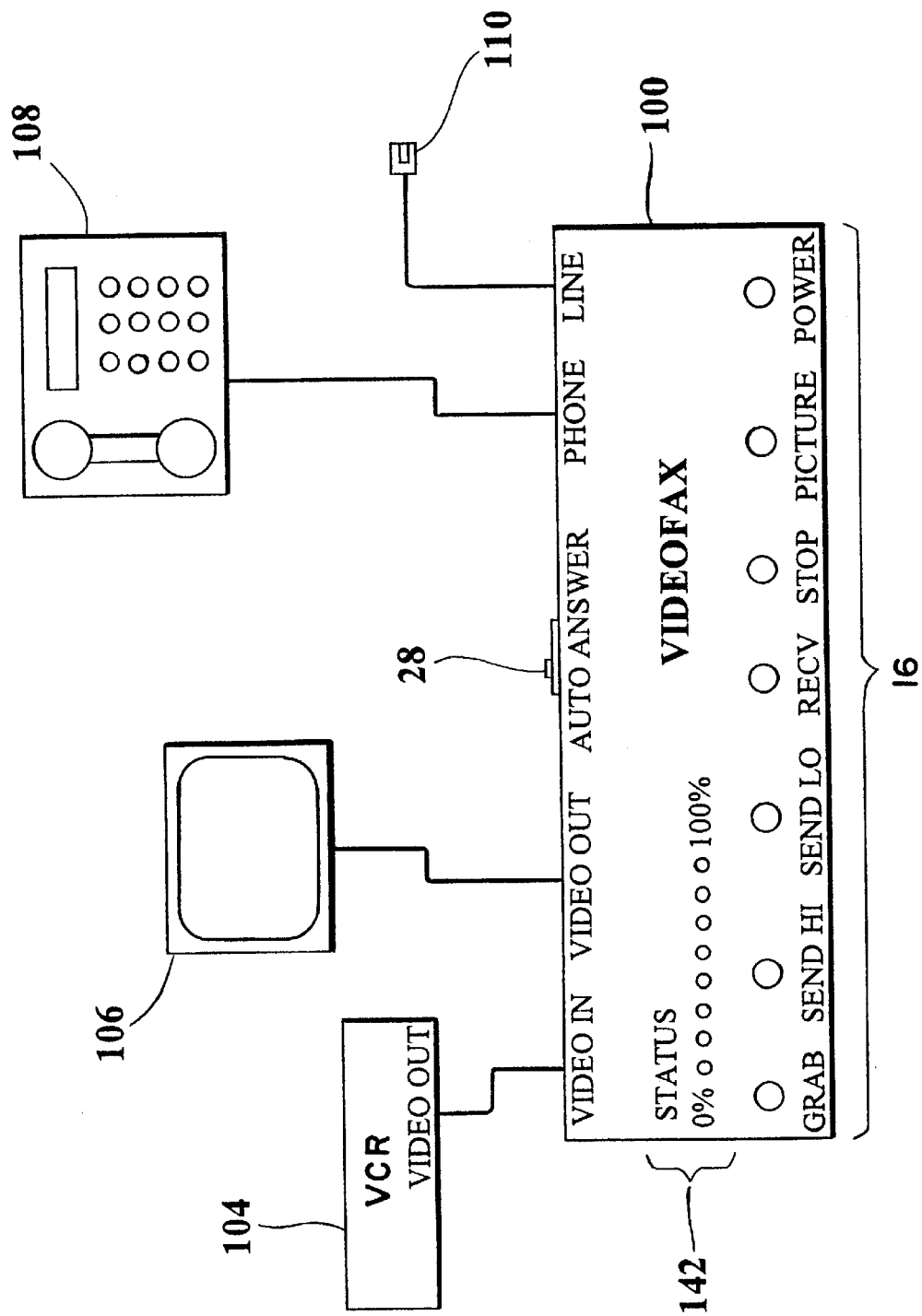
FIG. IC

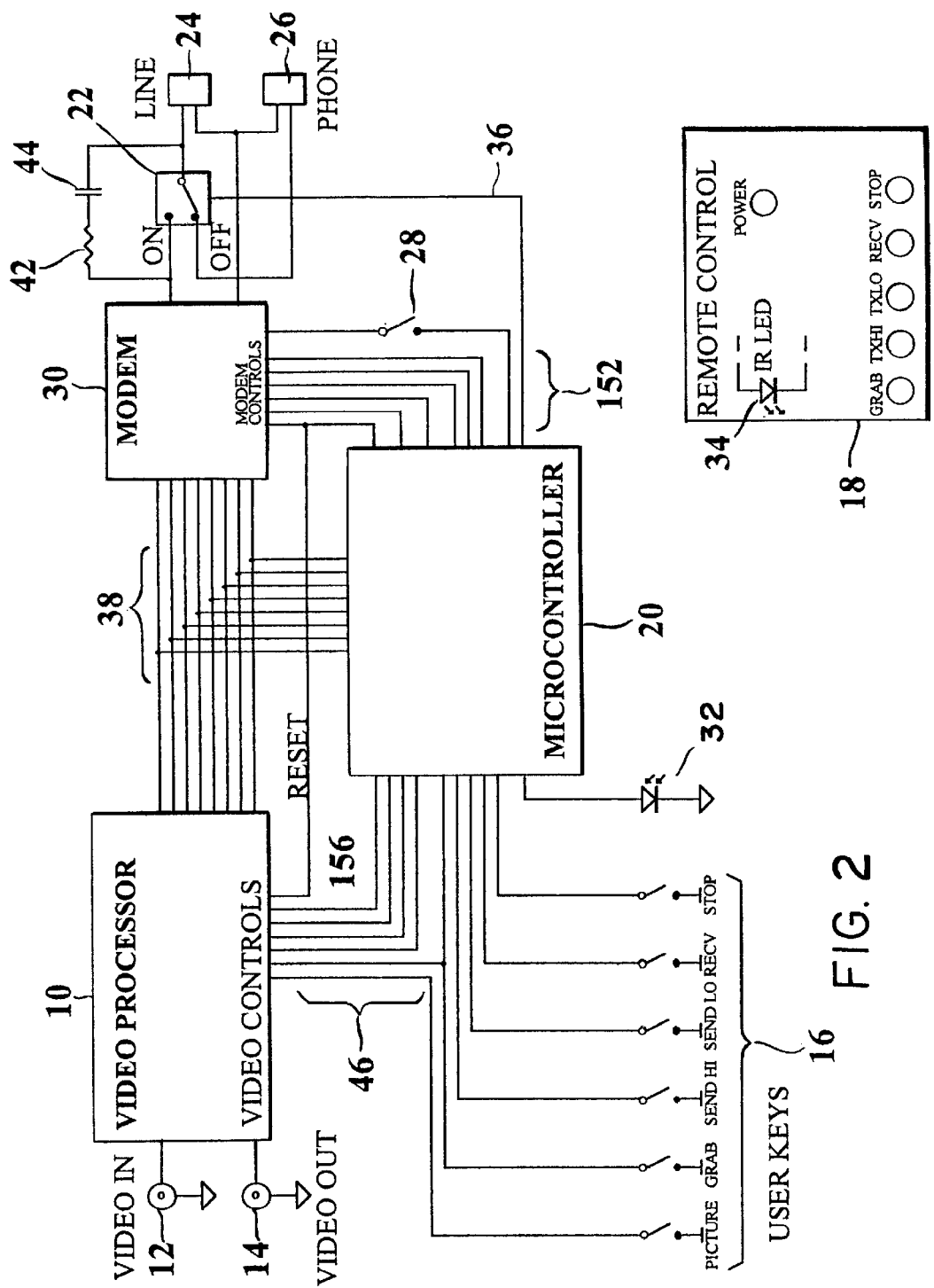

SYSTEM TO CAPTURE, STORE, AND RETRIEVE COMPOSITE VIDEO FOR TRANSMISSION OVER TELEPHONE LINES

BACKGROUND

1. Field of Invention

The present invention relates to videophone systems, specifically a videophone device which can transmit and receive still video images over a standard telephone line in response to a user command.

2. Prior Art

Videophones, which have been available in the consumer market for at least 20 years, are considered relatively complex and expensive systems. A videophone allows the transmission of video images over a standard telephone line. A fundamental problem associated with such transmission is the excessive frequency bandwidth of the video signal, as compared to the bandwidth of the telephone line.

The standard two-wire telephone-set connection, referred to as the public switched telephone network (PSTN), is designed to exchange audio information, specifically voice, between two or more users. Ideally, two users would communicate speech using a channel having a bandwidth equal to that of audible sound, nominally 20 Hz to 20 kHz. (This is the maximum frequency response of the human ear and high-fidelity audio systems are designed to provide such a response.) However, due to the large number of PSTN subscribers and economic considerations, the actual bandwidth of a telephone channel has been reduced to only 3.0 kHz (300 Hz to 3.3 kHz). This narrow bandwidth allocation allows more subscribers to simultaneously communicate through the PSTN, with negligible degradation of speech clarity. However, such a bandwidth provides relatively poor sound quality, typically noticed with voice received on a telephone.

The partition of a physical channel in the frequency domain into a multiplicity of channels with limited frequency response is referred to as frequency multiplexing. This method utilizes a physical channel very economically. For example, if a copper cable has a nominal transmission capability (bandwidth or frequency response) of 10 Mhz, then about 3,000 (10 Mhz/3 kHz) channels can be sent simultaneously over this cable, each with a 3 kHz bandwidth. (This principle underlies the present configuration of the PSTN.) Standard NTSC (National Television Systems Conference) video signals, on the other hand, have a bandwidth of approximately 4 Mhz, which enables only two channels to be transmitted over the same cable.

It is clear that video communication requires a relatively wideband channel, and telephone lines were not designed for this purpose. In general, transmitting an arbitrary signal through the standard telephone line is not possible without "sizing" the signal within the 300 Hz to 3.3 kHz frequency band. One way to accomplish this is to digitize the arbitrary signal (convert it to a stream of binary bits), and then transmit the digital data that result using a modem (modulator/demodulator). Modems can transmit digital data in the form of analog pulses through the essentially analog, band-limited telephone network. At the transmitter end, digital data (a stream of binary bits, 0's and 1's) is modulated into analog tones within the restricted bandwidth of the PSTN. At the receiver end, the analog tones are demodulated, the digital data extracted, and the arbitrary signal reconstructed.

The maximum number of digital bits per second or channel capacity (C) that a modem can transmit is limited by the bandwidth (B) and signal-to-noise ratio (SIN) of the physical channel. Shannon-Hartley theorem defines the relationship between C, B, and S/N as: $C=B*\log_2(1+S/N)$ bits/s (bits per second). For the PSTN, the channel capacity is approximately 40 kb/s (kilobits per second), assuming B=3.0 kHz and S/N=40 dB. If the sampling rate of the digitizing circuit is faster than the rate at which the modem can transmit data through the analog channel, the signal cannot be transmitted in real time. This case applies precisely to transmission of video signals through the telephone network. The Nyquist sampling rate required to digitize a video signal of 4 Mhz bandwidth is 8M samples/s, whereas the highest data rate achievable by most currently manufactured modems is 28.8 kb/s. Assuming that each digital sample contains 8 bits, 64 Mb/s (8M×8) would be required to transmit the video signal in real time. Even if a sophisticated compression algorithm like JPEG (Joint Photographic Experts Group) were used, which can compress video by a factor of about 20:1, a channel capacity of 3.2 Mb/s would still be required, substantially higher than what standard telephone modems can offer.

To circumvent this difficulty, video signals can be processed before compression and transmission. A standard NTSC video signal consists of 30 video frames per second. If the number of frames per second transmitted is reduced to only 1, for example, the data rate will be reduced by a factor of 30. And if one frame is transmitted every 10 seconds, the data rate required will be reduced by a factor of 300. Generally, the low data rate allowed by the telephone line can be approached by sufficiently decreasing the number of frames per second transmitted. However, decreasing the frame rate degrades the quality of moving video images and precludes the transmission of a full motion picture.

An additional complication in the transmission of digital video data over the telephone line is the simultaneous transmission of voice and video information. If voice must be transmitted in real time, at least 50% of the telephone channel will be used by the audio information. This makes the channel capacity even more restricted for video information.

Modem computers process video signals in three dimensions, red, blue, and green, each color component generally requiring digital samples at least six bits wide. Although this method requires 18 bits (rather than eight) of data per pixel (video image dot), the transmission speed of video images can be increased by reducing the number of pixels transmitted, which however results in loss of resolution.

Numerous digital video storage methods and videophones are known in the art. Horgan, in U.S. Pat. No. 4,857,990 (1989), discloses a relatively complex method of storing a full 525-line, NTSC video frame in a 256 kByte dynamic RAM (DRAM). Each horizontal scan line is digitized at a sampling rate 8/3=2.67 times the subcarrier frequency of an NTSC signal, into a number of samples equal to the number of columns in the memory where the frame is to be stored. The color burst is sampled partially and stored independently, requiring a dedicated circuit to reconstruct the phase reference signal of the color picture from the digital samples of the color burst. Horgan's scheme is clever, but has serious drawbacks. The digital memory must be organized into 512 rows by 512 columns, or any other combination that matches the number of digital samples per horizontal line and the number of horizontal lines themselves. Therefore, the method is strictly limited to NTSC video signals with 525 lines, and can only use memory arrays generally found in DRAM. Although DRAM is inexpensive, it requires memory refresh controls that can add substantial cost and timing limitations to the system.

Kashigi, in U.S. Pat. No. 4,325,075 (1982), discloses a complicated video storage scheme that also addresses European (PAL and SECAM) color television systems. Kashigi stores video digital samples in a plurality of memory blocks, and requires a complex memory address control circuit to synchronize the selection of horizontal and vertical memory blocks.

Yamamoto, in U. S. Pat. No. 5,452,022 (1995), discloses a digital storage device for a still video apparatus. A video signal is decoded into a luminance signal and two color difference signals. The three signals are digitized by three analog-to-digital (A/D) converters and stored in a digital memory. A control circuit is provided to stop the A/D converting operation during the blanking level, so that the blanking level data can be stored in a buffer memory. The composite video signal can be reconstructed by means of three D/A converters that read the digital video data, and a control circuit that retrieves blanking level data from the buffer memory. Yamamoto's system is too expensive to be used in large-scale production, as it requires a decoding circuit to generate the luminance and color difference signals, three A/D converters, three D/A converters, and a complex synchronizing digital scheme.

Filo, in U.S. Pat. No. 5,079,627 (1992), discloses a videophone that can transmit a full motion picture of reasonably good quality. However, the image capturing method is non-standard and the system requires the use of either a CRT monitor or a mechanical rotating disk of film to display the incoming images. The nature of this imaging apparatus makes the system incompatible with modem video devices such as cameras and TV displays, and in this sense Filo's videophone can be considered obsolete.

In 1995, Casio-Phonemate Inc. of Torrance, Calif., introduced a video conferencing system at the Consumer Electronics Show in Las Vegas, Nevada. This system, designated LT-70, costs approximately $1,500 per unit, includes a small, non-standard video camera, and is compatible with only NTSC video. To use the LT-70, a user initiates a telephone call with a distant party, and then establishes communication between two LT-70 units by having both parties simultaneously press start buttons. Normally the users synchronize the press of the start button by counting one, two, and three at the same time, and then pressing the button. After a short handshaking routine, communication between the two LT-70 units is established. The LT-70 now continuously sends and receives a still, low-resolution video image approximately every 3.5 seconds; this image can be displayed on a standard TV monitor. The users can talk to each other during video transmission. High-resolution image transmission can be selected, but it takes about 30 seconds to transmit an entire video image in high resolution mode. Even though this video conferencing system is functionally very sophisticated, it suffers a great deal of disadvantages. The system is expensive and cannot be afforded by the general public. (It is necessary to buy two LT-70 units to video conference, for a total cost of about $3,000). The initial synchronization procedure to start communication between two units is very awkward, as it requires nearly perfect coordination of the two users (a synchronized count). Because still images are grabbed and transmitted automatically every 3.5 seconds, the images do not result in a full motion picture and sometimes display the users in an undesirable position or expression. The quality of voice communication is substantially degraded due to the relatively large amount of data to be transmitted (voice and video) in the restricted bandwidth of the telephone line. Finally, because the system relies on a modem carrier to maintain communication between two users, the telephone connection is susceptible to interruptions due to a carrier loss. A carrier loss may occur as a result of noise on the telephone line, a call-waiting signal from the central office of the telephone company, or the activation of an extension phone connected to the same telephone line in the same household, for example. The probability of losing a connection is directly proportional to the amount of time that the users spend video conferencing, and the connection is likely to be lost in an extended video conferencing session.

A number of video conferencing systems are available today at a retail price of about $200, but they all require an expensive personal computer (PC) to function. To operate these systems, the user has to be "computer literate" and must follow a relatively complex installation procedure. Establishing a video conferencing session requires substantial effort by the user, and the session relies on continuous modem communication, which can often result in a lost connection during an extended session.

In general, existing video conferencing systems grab and transmit video images dynamically, without letting the user discard images or decide which image to send. The lack of "privacy" associated with the operation of these systems (in addition to their cost and complexity) is probably the reason why such systems have not become popular for home or business use.

OBJECTS AND ADVANTAGES

Accordingly, several objects and advantages of the present invention are:

(a) to provide an improved video transmission system over a standard telephone line at very low cost;

(b) to provide a video transmission system which can be implemented using standard, off-the-shelf parts, and a simple software code stored in a microcontroller;

(c) to provide a video transmission system which does not require a personal computer (PC) to function and can be operated by the user with no supervision, other than to initiate a video image transmission by pressing a user key;

(d) to provide a video transmission system that minimizes the probability of interrupting the telephone connection between two users;

(e) to provide a video transmission system which the user can operate from a distance using an infrared remote control unit;

(f) to provide a video transmission system that allows the user to choose the image to be transmitted before electing to send it to another party;

(g) to provide a video transmission system which allows retrieval of video images from remote locations for security purposes, using dual-tone-multi-frequency (DTMF) signals;

(h) to provide a digital video storage method compatible with NTSC, PAL, and SECAM video formats;

(i) to provide a digital video storage method which requires a reduced amount of digital memory; and (j) to provide an efficient method to transmit data representing a video frame, through the telephone line.

Further objects and advantages will be apparent from a consideration of the ensuing description and accompanying drawings.

DESCRIPTION OF DRAWINGS

FIG. 1A shows a system setup of a video image facsimile system (videofax) according to the present invention, where a video camera is used as a source of video images and a TV monitor is used to display the images.

FIG. 1C shows another alternative system setup of the videofax, wherein a VCR can be used as the source of video images.

FIG. 2 shows a block diagram of the videofax according to the present invention.

FIG. 3 shows an infrared remote control unit of the videofax.

SUMMARY OF THE INVENTION

Figure 1B:
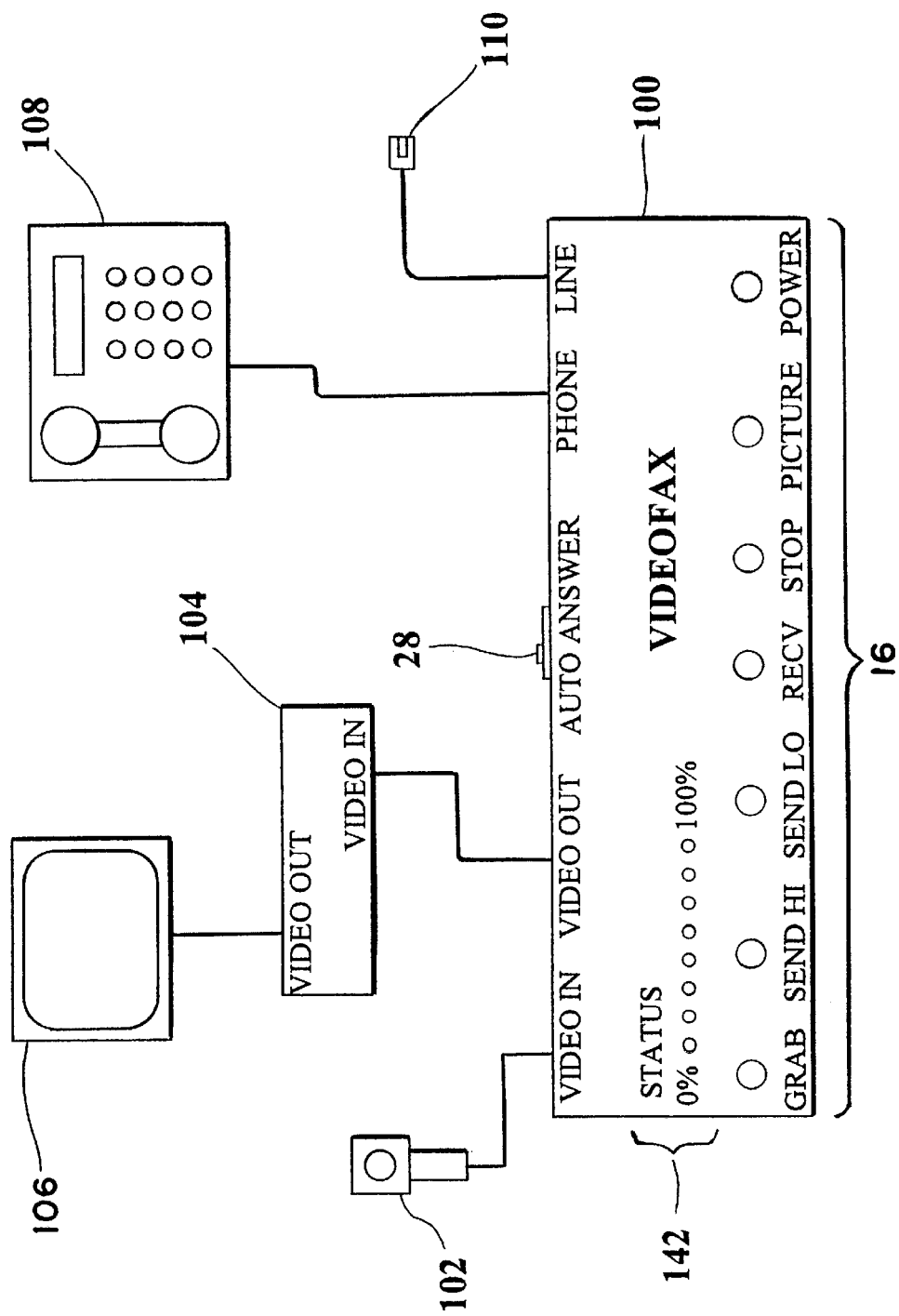
FIG. 1B shows an alternative system setup of the videofax, where video images can be stored in a standard video cassette recorder (VCR).

The videofax is a system that can store a video image in a relatively small digital memory, and transmit the video image as digital data through standard telephone lines. The system is inexpensive enough to be accessible to the general public, and allows static transmission of video information through the PSTN in the same manner as fax machines transmit text or graphics.

The user selects a video image to be transmitted by instantaneously freezing a frame of a video signal from a standard video camera or VCR, and displaying such frame as a still video image in a standard TV monitor. The user can choose the image to send by pressing a GRAB button, waiting for the image of choice, and then releasing the button. The process is user-friendly and can be repeated as many times as necessary before electing to transmit an image. This feature assures privacy to the users and prevents undesirable images from being transmitted.

Because the telephone line has limited bandwidth, no simultaneous transmission of voice and video is allowed. (An attempt to accomplish simultaneous transmission would inevitably result in increased complexity and cost of the system.) As a result, two modes of operation are defined: a voice mode, where the users can communicate normally by telephone, and a video transmission mode, where the users are placed on hold while the digital data is being transmitted. The transition between voice and video transmission modes is controlled by the user.

After grabbing the video image of choice, the user initiates video transmission and the process is fully automated until the video image is transferred completely to the other party. Voice communication is resumed automatically after the image is sent. Either user can interrupt video transmission at any time by pressing a STOP button, whereupon the users can resume voice communication. In such a case, only the partial data transmitted would be displayed.

The videofax is composed of a video processor, a modem, and a microcontroller. A DTMF detector circuit allows control of the videofax from a remote telephone using DTMF signals, and an infrared signal detector allows control of the videofax from a distance using an infrared remote control unit.

The video processor digitizes the video signal to be transmitted and stores it in a digital memory with virtually no data processing. Any processing before transmission would require processing after transmission, and would increase the complexity and cost of the system. The simplicity of the video processor makes this video storage method compatible with NTSC, PAL, and SECAM formats. Compression of the digital data is not performed by costly and complicated digital signal processors (DSP), but rather the data is compressed by the modem during transmission, using compression protocols that can achieve compression ratios up to 4:1 (V42.bis).

The microcontroller detects user commands by scanning a number of external user keys, decoding an infrared signal received from the remote control unit, or reading the DTMF detector. User commands are then executed by activating a plurality of controls on the video processor and modem, as described in the ensuing discussion.

All components of the videofax are standard, commercially available items, or are made of an interconnected combination of such items, as will be described.

Description of FIGS. 1A, 1B, and 1C—Overall System Setup

FIG. 1A shows a standard setup of all system components of the videofax. A video output of a video camera 102 is coupled to an input (VIDEO IN) of a videofax unit 100, and a standard TV monitor 106 is coupled to an output (VIDEO OUT) of videofax 100. A telephone set 108 is connected to a PHONE jack of videofax 100, and a PSTN terminal 110 is connected to a LINE jack of videofax 100. Seven user keys 16 are present on videofax 100: a GRAB key to capture a video image from video camera 102, SEND HI, SEND LO, RECV, and STOP keys to control transmission of video images through telephone line 110, a PICTURE key to adjust the color of video images displayed on TV monitor 106, and a POWER key to activate or deactivate normal and remote functions of videofax 100. Eight status indicator LEDs 142 are visible on videofax 100 during a video image transmission, and display the progress of the transmission as a percentage. An Auto Answer switch 28 is provided in videofax 100 to enable the detection of ring signals from PSTN terminal 110.

FIG. 1B shows an alternative setup of the system components of the videofax. A video input of a VCR 104 is coupled to output VIDEO OUT of videofax 100, and TV monitor 106 is coupled to a video output of VCR 104.

FIG. 1C shows another alternative setup of the system components of the videofax. The video output of VCR 104, rather than video camera 102, is coupled to input VIDEO IN of videofax 100, and TV monitor 106 is coupled to output VIDEO OUT of videofax 100.

Description of FIGS. 2 and 3—Videofax System

FIG. 2 shows three major sections of the videofax: a video processor 10, a microcontroller 20, and a modem 30. Video processor 10 is the interface of the system to an external video source and TV monitor. The video source is connected to an input (VIDEO IN) 12, and the TV monitor to an output (VIDEO OUT) 14. Microcontroller 20 is a microcomputer having a ROM (Read Only Memory) in which a predetermined software program of about one kilobyte is stored. This software program (discussed below) controls the user interface functions of the videofax. Video control lines 46 interconnect video processor 10 to microcontroller 20. A data bus 38 provides a bidirectional interface between video processor 10, microcontroller 20, and modem 30. Modem 30 is a high-speed telephone modem (preferably 14.4 kb/s, to reduce cost) that uses standard error correction and compression protocols. Modem control lines 152 interconnect microcontroller 20 and modem 30. Modem 30 interfaces to the PSTN through a connector (LINE) 24 when a single-pole, double-throw relay 22 is set to an ON position (relay closed), or through the series combination of a resistor 42 and a capacitor 44 when relay 22 is set to an OFF position (relay open). When relay 22 is open, a connector (PHONE) 26 is coupled to the PSTN through LINE 24. Microcontroller 20 determines the state of relay 22 through a control line (RELAY) 36. An Automatic Answer switch 28 couples a control line RING from modem 30 to microcontroller 20. A RESET control line 156 from microcontroller 20 is coupled to video processor 10 and modem 30. User keys 16 provide an interface between the user, video processor 10, and microcontroller 20.

A remote control unit 18 (FIG. 3) can activate user control keys 16 remotely by means of infrared (IR) control signals emitted by an IR LED (light-emitting diode) 34 and received by microcontroller 20 through a photodiode 32.

Figure 4A:
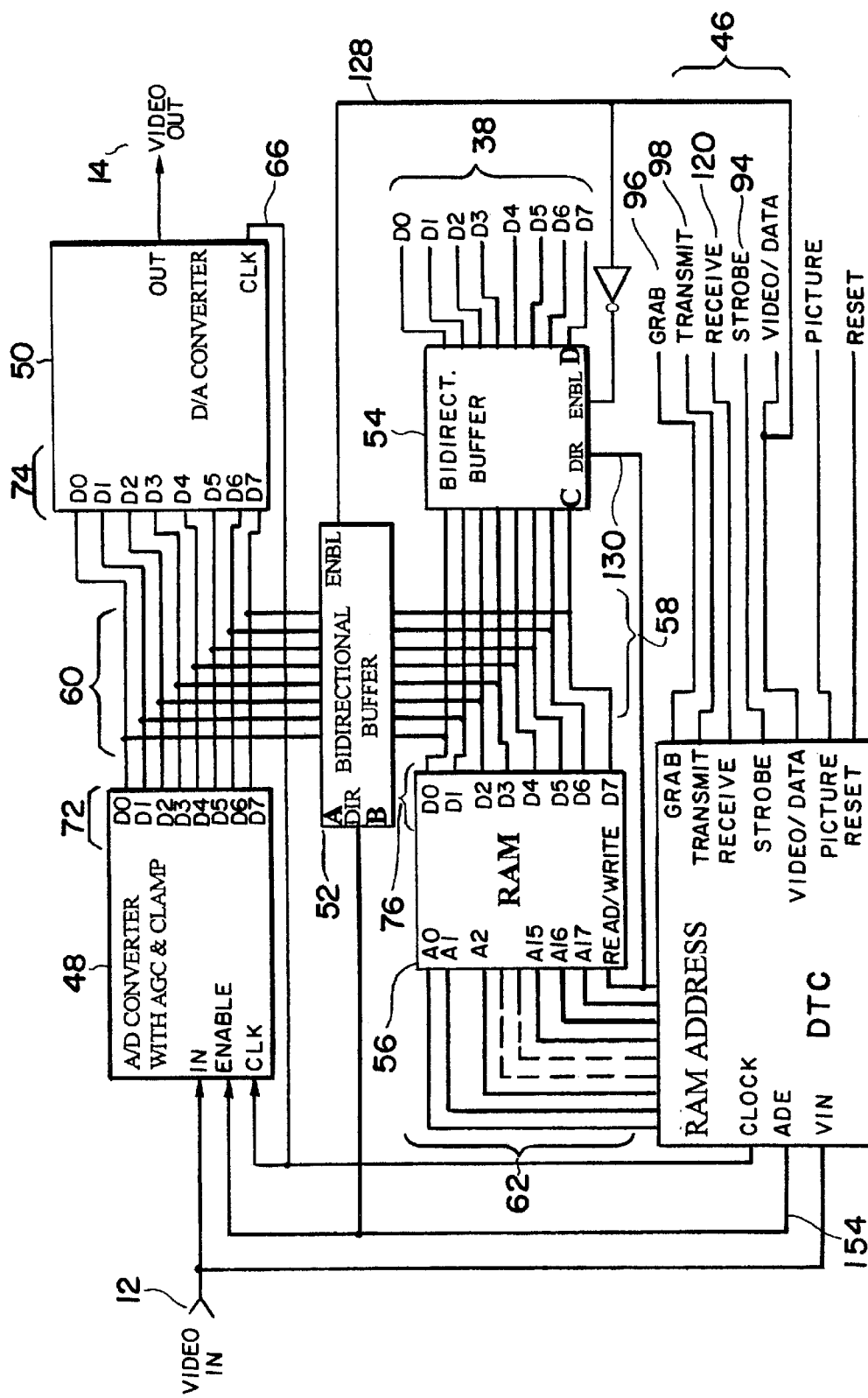
FIG. 4A shows a video processor circuit used in the videofax.
Figure 4B:
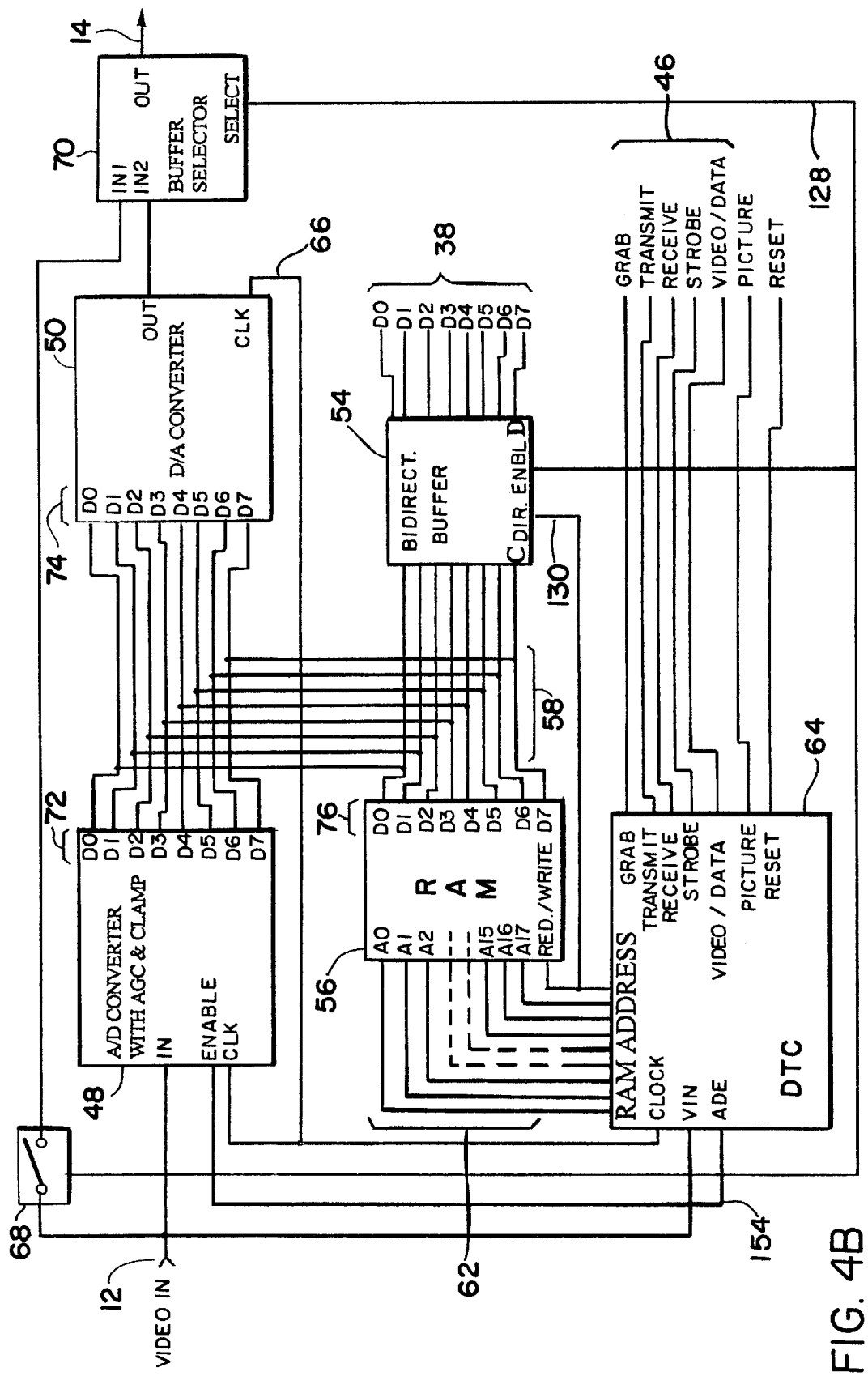
FIG. 4B shows an alternative video processor circuit with a bypass video switch.

Description of FIGS. 4A and 4B—Video Processor

FIG. 4A shows a block diagram of video processor 10. A signal from an external video source is coupled to a high-speed A/D converter 48 and a digital timing circuit (DTC) 64 through input VIDEO IN 12. A/D converter 48 includes an automatic gain control (AGC) and clamp circuit to condition the video input signal. Output lines 72 of A/D converter 48 are coupled to input lines 74 of a high-speed D/A converter 50 and to an input/output (I/O) port A of a bidirectional buffer 52 through a high-speed data bus 60. An I/O port B of buffer 52 is coupled to I/O lines 76 of a random-access memory (RAM) 56 through a data bus 58. A second bidirectional buffer 54 couples data bus 58 with data bus 38 through I/O ports C and D, respectively. DTC 64 is coupled to microcontroller 20 (see FIG. 2) through video control lines GRAB 96, TRANSMIT 98, RECEIVE 120, STROBE 94, and VIDEO/DATA 128, and to RAM 56 through RAM address control lines 62 and a control line READ/WRITE 130. DTC 64 also provides a clock signal 66 to both A/D converter 48 and D/A converter 50, and an enable control ADE 154 to A/D converter 48 and buffer 52.

FIG. 4B shows an alternative configuration of video processor 10. A bypass switch 68 has an input coupled to VIDEO IN 12 and a control terminal coupled to a VIDEO/DATA output 128 of video controls 46. A buffer selector 70 has a first input coupled to an output of bypass switch 68, a second input coupled to the output of D/A converter 50, and a control input SELECT coupled to DTC 64 through VIDEO/DATA control 128. An output of buffer 70 is coupled to VIDEO OUT 14. Bidirectional buffer 52 and bus lines 60 are not required in this configuration.

Figure 5:
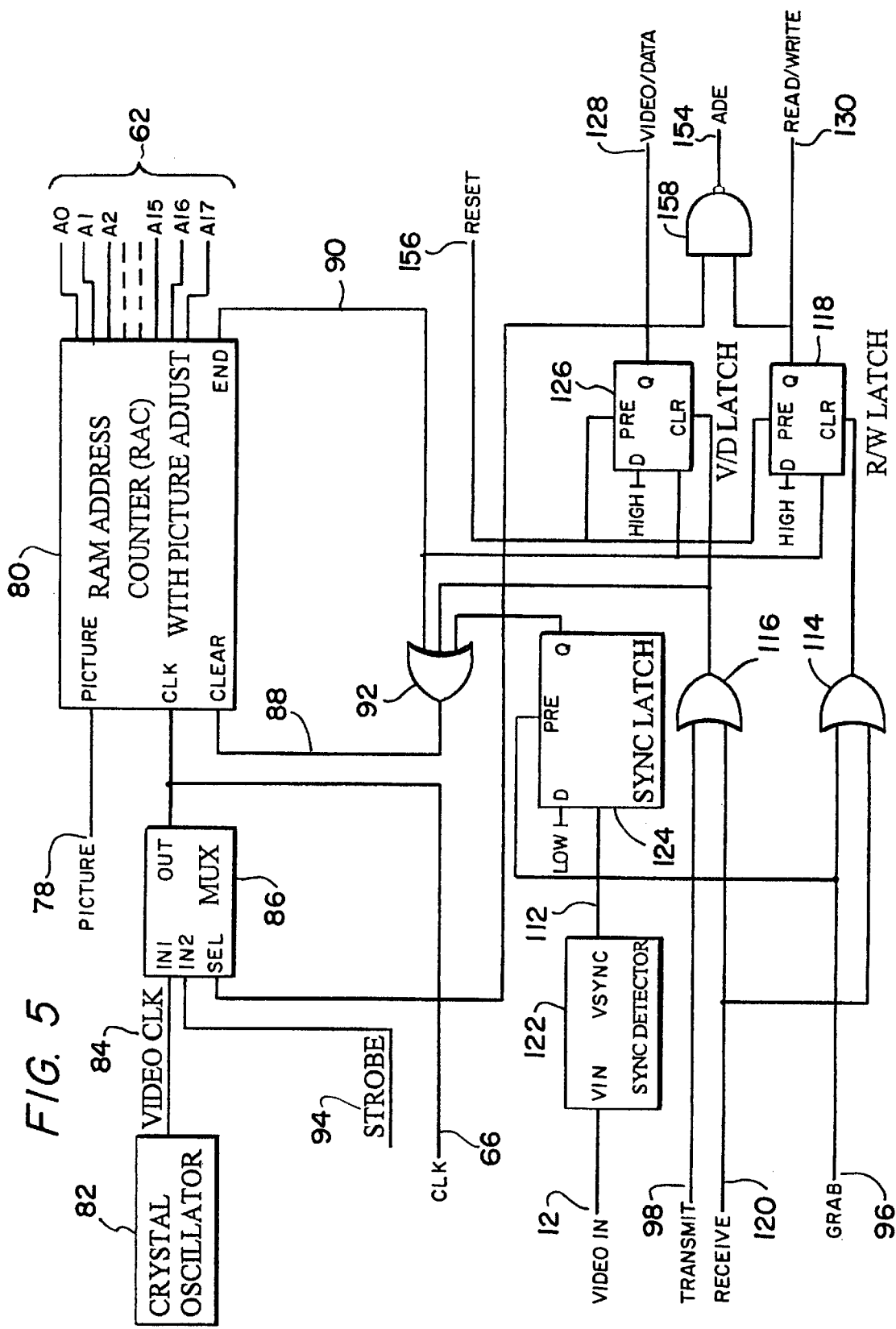
FIG. 5 shows a digital timing circuit used in the video processor.

Description of FIG. 5—Digital Timing Circuit (DTC)

FIG. 5 shows a detailed diagram of DTC 64. An output of a multiplexer (MUX) 86 provides clock signal (CLK) 66 to a clock input of a RAM address counter (RAC) 80. A plurality of outputs (A0, A1, . . . A17) of RAC 80 are coupled to RAM 56 (see FIG. 4A) through RAM address lines 62. A CLEAR control input of RAC 80 is coupled to an output line 88 of an OR gate 92. A PICTURE control input 78 of RAC 80 is coupled to user keys 16 (see FIG. 2). Two clock lines VIDEO CLK 84 and STROBE 94 are coupled to two inputs IN1 and IN2 of MUX 86, respectively. VIDEO CLK 84 is generated by a crystal oscillator 82, and STROBE 94 is provided by microcontroller 20 (see FIG. 2). An output of a video/data (V/D) latch 126 generates control VIDEO/DATA 128 and is coupled to an input select SEL of MUX 86. VIDEO/DATA 128 selects one of two clocks, VIDEO CLK 84 or STROBE 94, in MUX 86 to drive CLK 66. V/D latch 126 has a data (D) input fixed at logic HIGH, and a clock input coupled to an END output 90 of RAC 80. END output 90 is also coupled to a first input of OR gate 92, and to a dock input of a read/write (R/W) latch 118. R/W latch 118 has a data input (D) fixed at logic HIGH, and an output READ/WRITE 130 coupled to an input of RAM 56 (see FIG. 4A). VIDEO IN 12 is coupled to an input of a video sync detector 122, and an output VSYNC 112 of sync detector 122 drives a clock input of a sync latch 124. An output of sync latch 124 is coupled to a second input of OR gate 92. A GRAB input 96, generated either by user keys 16 or by microcontroller 20 (see FIG. 2), is coupled to a preset (PRE) input of sync latch 124 and to a first input of an OR gate 114. A RECEIVE signal 120, generated by microcontroller 20 (see FIG. 2), is coupled to a second input of OR gate 114 and to a first input of an OR gate 116. A TRANSMIT signal 98, generated by microcontroller 20 (see FIG. 2), is coupled to a second input of OR gate 116. An output of OR gate 116 is coupled to a third input of OR gate 92 and to a clear (CLR) input of V/D latch 126. An output of OR gate 114 is coupled to a clear (CLR) input of R/P latch 118. A RESET control 156, generated by microcontroller 20 (see FIG. 2), is coupled to a preset (PRE) input of V/D latch 126 and to a preset (PRE) input of R/W latch 118. A NAND gate 158 has a first input coupled to VIDEO/DATA 128, a second input coupled to READ/WRITE 130, and an output coupled to control ADE 154.

Figure 6A:
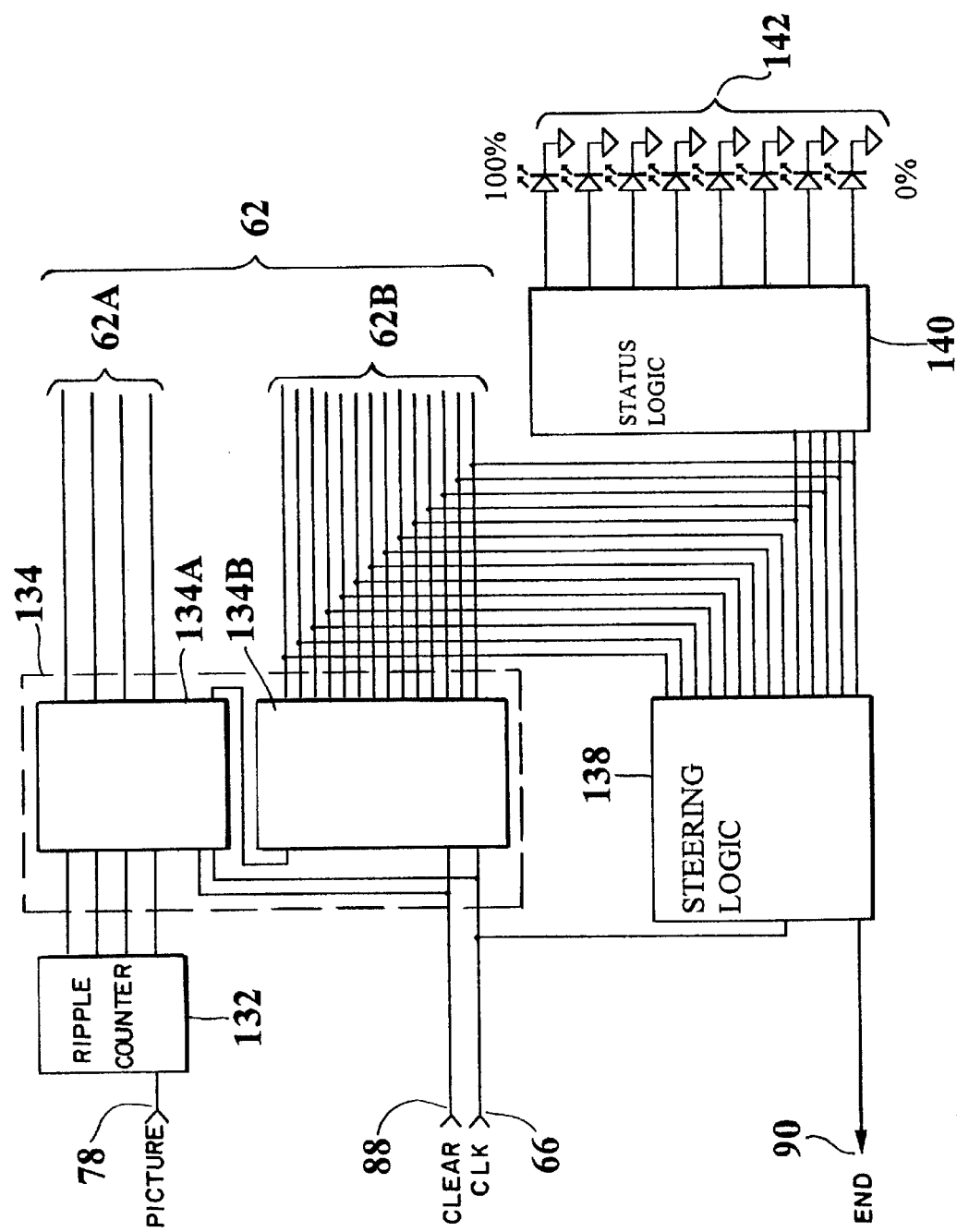
FIG. 6A shows a RAM address control with picture adjust circuit and fixed steering logic used in the video processor.

Description of FIG. 6A—RAM Address Control (RAC) with Picture Adjust

FIG. 6A shows a detailed diagram of RAC 80. PICTURE control 78, generated by user keys 16 (see FIG. 2), is coupled to a clock input (CK) of a four-bit ripple counter 132 (an asynchronous counter). A plurality of outputs of an 18-bit synchronous counter 134 is coupled to address lines 62 of RAM 56 (see FIG. 4A), and a clock input of counter 134 is coupled to CLK 66. Synchronous counter 134 is composed of a four-bit synchronous counter 134A and a 14-bit synchronous counter 134B. Counter 134A has four data set inputs, S0, S1, S2, and S3, coupled to outputs Q0, Q1, Q2, and Q3 of ripple counter 132, respectively, and a LOAD input coupled to CLEAR control 88. Counter 134A has four outputs 62A (A0, A1, A2, and A3) forming the least significant bits of RAM address lines 62. Counter 134B has a reset input (RST) coupled to CLEAR control 88, and outputs 62B (A4, A5 . . . A17) forming the most significant bits of RAM address lines 62. An output (FULL) of counter 134A is coupled to an input (ENABLE) of counter 134B. A steering logic circuit 138 has a clock input (CK) coupled to CLK 66, a plurality of inputs (IN0, IN1 . . . IN13) coupled to RAM address lines 62, and an output coupled to END control 90. A status logic circuit 140 has inputs (IN1, IN2 . . . IN5) coupled to outputs 62B of counter 134B, and outputs (L0, L1 . . . L7) coupled to eight status indicator LEDs 142.

Figure 6B:
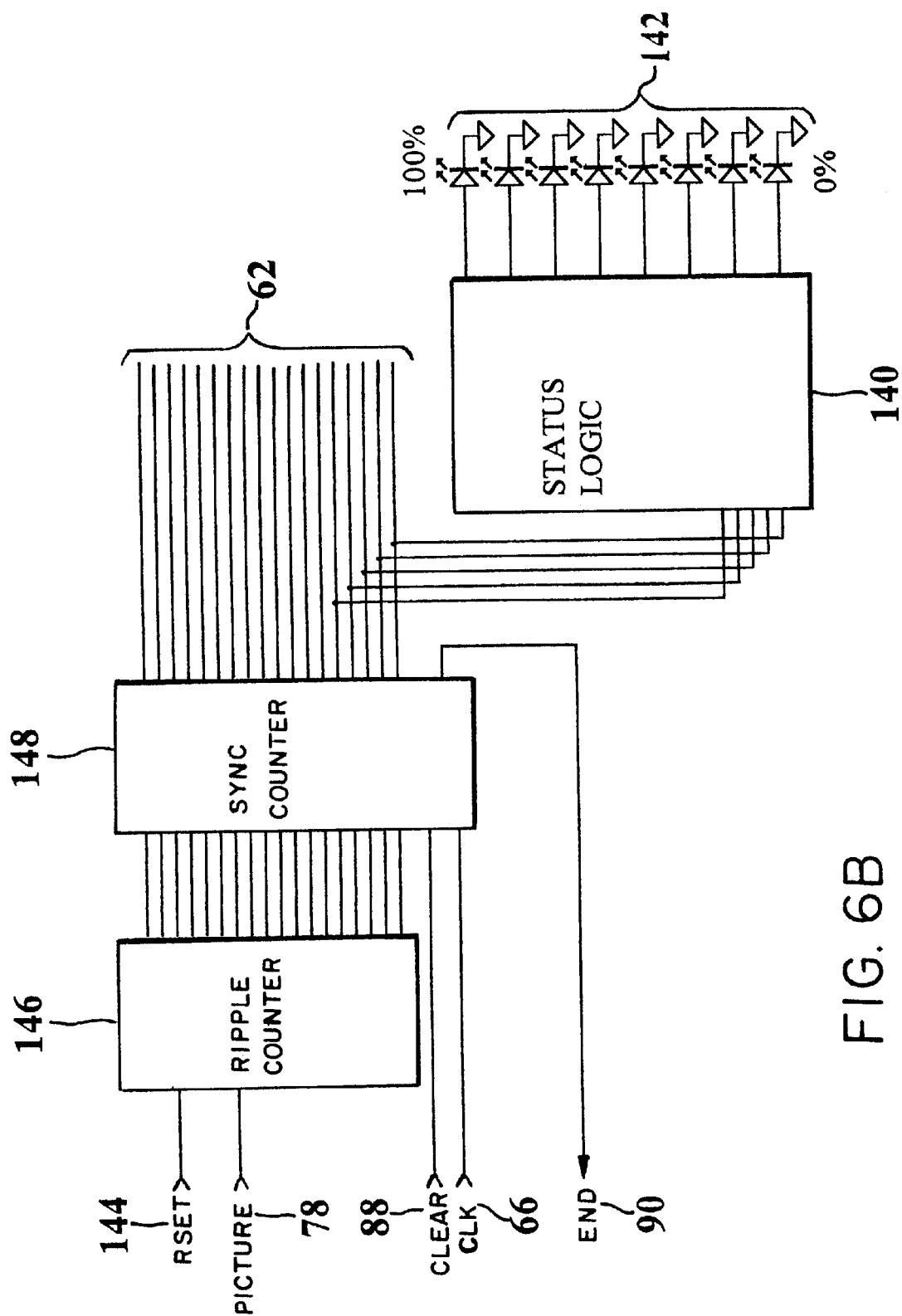
FIG. 6B shows an alternative RAM address control with programmable steering logic.

Description of FIG. 6B—RAM Address Control (RAC) with Programmable Steering Logic FIG. 6B shows an alternative configuration of RAC 80. A dock input (CK) of an 18-bit ripple counter 146 is coupled to PICTURE control 78, and a reset input (RST) of counter 146 is coupled to a RSET control 144. A plurality of outputs (Q0, Q1 . . . Q17) of counter 146 is coupled to data set inputs (S0, S1 . . . S17) of an 18-bit synchronous counter 148. Counter 148 has a plurality of outputs (A0, A1 . . . A17) coupled to address lines 62 of RAM 56 (see FIG. 4A), a clock input (CK) coupled to CLK signal 66, and an input (LOAD) coupled to CLEAR control 88. Status logic circuit 140 has inputs (IN1, IN2 . . . IN5) coupled to outputs A13, A14 . . . A17 of counter 148, and outputs L0, L1 . . . L7 coupled to eight status indicator LEDs 142 (as in FIG. 6A).

It is apparent from the above description that the videofax uses simple, standard, and inexpensive components. As a result, the videofax can be manufactured today for less than $100. For example, the digital timing circuit can be implemented using a standard XC7354 programmable logic device (EPLD) manufactured by Xilinx of San Jose, Calif. Alternatively, an application-specific integrated circuit (ASIC) can be used to reduce cost further. The A/D and D/A converters can be a TDA8708 and a TDA8702, respectively, manufactured by Philips of Sunnyvale, Calif. The modem can be a standard 14.4 kb/s or 28.8 kb/s modem manufactured by Cirrus Logic of Fremont, Calif., or Rockwell Semiconductors of Newport Beach, Calif. (If a 28.8 kb/s modem is used, the transmission time can be reduced to about 10 seconds for low-resolution images, and about 20 seconds for high-resolution images, respectively.) Due to the simplicity of the videofax functions, the microcontroller can be a standard COP8780 manufactured by National Semiconductor of Santa Clara, Calif., or a PIC16C64 manufactured by Microchip of Chandler, Ariz. The size of the software code required is only about one kilobyte.

Operation of FIGS. 1A, 1B, and 1C—Overall System

The videofax is simple and user-friendly to operate, as will be described below with reference to FIG. 1A. To use videofax 100, a user sits in front of video camera 102 while conversing on the telephone and looks at TV monitor 106. The user presses and holds down the GRAB key to display on TV monitor 106 the motion picture captured by video camera 102. When a desirable image is displayed, the user releases the GRAB key and the specific image is stored in videofax 100 and displayed on TV monitor 106.

If the user is not satisfied with the image, they can repeat the process indefinitely and grab and store a new image (which overwrites the previous image) until satisfied with the choice.

After the image is selected, the user advises the other party on the telephone line that an image is about to be transmitted, and then presses the SEND HI or SEND LO key to initiate a video image transfer at either high or low resolution, respectively.

The videofax now suspends voice communication and sends two DTMF signals, corresponding to the tones associated with the star (*) key located in the lower, left-hand corner of a telephone keypad, to the receiver unit to automatically initiate the receive process.

When the videofax at the receiver end detects DTMF signals * *, it begins to handshake with the videofax at the transmitter end, i.e., negotiate a data communication protocol and data rate based on telephone line conditions.

The RECV key is provided to allow the receiving party to manually start the receive process in case the automatic process fails for any reason. For example, if the user at the receiver end happens to speak on the telephone while the DTMF signals are being sent, the receiver unit may fail to detect the signals. In this case, the transmitter end starts generating a calling tone intermittently to prompt the user at the receiver end to manually initiate the receive process. When the calling tone is present, the user at the receiver end can press the RECV key or, alternatively, press the * key twice on their telephone (if the telephone can generate DTMF signals) to initiate the receive function.

Handshaking is completed in a few seconds, and transfer of the video image begins automatically. Status indicators 142 display the percentage of data transmitted at the transmitting end, and the percentage of data received at the receiving end. When transmission/reception is 100% complete (all status indicators are lit), voice communication is resumed at both ends and the transmitted image appears at the receiving end.

At any time during the transmission/reception process, the party at the transmitting or receiving end can abort the process unconditionally by pressing the STOP key on the videofax.

To adjust minor color and picture imperfections, the user can press the PICTURE key in steps (16 possible settings), until the image appears best. Such adjustment is only required once, and varies with the specific video source and TV monitor used.

A complete image transfer normally takes about 20 to 40 seconds for low or high resolution transmission, respectively, if a 14.4 kb/s modem is used in videofax 100. The send/receive procedure can be repeated as many times as desired during the same telephone connection.

FIG. 1B shows a system configuration setup of the videofax that allows the user at the transmitting or receiving end to record on videotape, using a VCR, the video image stored in videofax 100 and displayed on TV monitor 106. For example, when an image is received, the user can activate the record feature in the VCR and store the image on videotape before grabbing or receiving the next image (which overwrites and erases the previous image). A more expensive embodiment of videofax 100 can be implemented to allow the user to store multiple images in the internal memory of the videofax, rather than use a VCR to store images on a videotape.

FIG. 1C shows a system configuration setup of the videofax that allows the user to grab video images from a prerecorded videotape in VCR 104. VCR 104 is operated in play mode and serves as the source of video images. The user follows a procedure similar to that described for a video camera to grab the desired image, and sends the image by pressing the SEND HI or SEND LO key.

FIGS. 1A and 1B also show a configuration setup which is suitable for operation of the videofax in remote mode. In remote operation, the user can remotely instruct videofax 100 to grab and send an image by entering a password using DTMF signals. The user can program the videofax to operate in remote mode by holding the POWER key pressed for three seconds or more, when turning on videofax 100. In remote mode, keys SEND HI, SEND LO, and RECV are inactive, i.e., even if pressed, they will not respond.

If telephone set 108 is an automatic telephone answering machine, Auto Answer switch 28 can be set to the OFF position when operating videofax 100 in remote mode. In this setting, videofax 100 will not respond to incoming rings from PSTN 110 and will let the answering machine answer the phone to record telephone messages. If the user wants to use videofax 100 to monitor their home or office from a remote location while they are away, they initiate a call from the remote location and wait for answering machine 108 to answer the phone. When the phone is answered, the user presses the pound (#) key (located in the lower, right-hand corner of a telephone keypad) twice on the remote telephone (assuming the remote telephone can generate DTMF tones), and gives videofax 100 an instruction to connect to PSTN 110, disconnect answering machine 108, and listen for a user password. If the user enters the correct password (which they had preset in the remote videofax unit), videofax 100 automatically grabs an image from video camera 102, and sends it at low or high resolution. The default transmission setting is low resolution, but the user can select high resolution by entering their password starting with digit "0" (digit "0" cannot be used as a number in a password). After the image transmission is completed, the remote videofax waits for the password again to grab and send another image. If no valid password is received within 30 seconds, the remote videofax hangs up.

If telephone set 108 is not an automatic telephone answering machine, Auto Answer switch 28 must be set to the ON position to operate videofax 100 in remote mode. In this setting, videofax 100 answers an incoming call automatically after two rings, and waits for the user to enter a password using DTMF tones. From this point on, the same steps outlined above for the case in which Auto Answer switch 28 is set to the OFF position apply. The user can grab and receive an image from a remote location by entering a password, and continue to receive images by entering the password again within 30 seconds from the end of a previous transmission.

Operation of FIGS. 2 and 3—Videofax System

FIG. 2 illustrates the operation of videofax 100. When the GRAB key is pressed, video processor 10 sends the video input signal received from the video source at VIDEO IN 12 directly to VIDEO OUT 14. When the GRAB key is released, video processor 10 stores the first frame detected in the video input signal to an internal memory, and then sends the stored image to VIDEO OUT 14. Microcontroller 20 and modem 30 are idle during the image capture process, and relay 22 is normally in the OFF position (modem disconnected from LINE 24).

If the SEND HI or SEND LO key is pressed, microcontroller 20 detects the key press and initiates a send operation. Using a modem control START, microcontroller 20 initiates a transmit handshaking routine by sending a transmit initialize string to modem 30 through data bus 38. At the same time, microcontroller 20 sets relay 22 to the ON position (through RELAY control 36), which connects modem 30 to LINE 24 (PSTN) and disconnects PHONE 26 (telephone set) from LINE 24. Modem 30 begins the transmit handshaking routine with the emission of DTMF signal sequence * * on the telephone line.

At the receiving end, modem 30 detects the DTMF signal sequence * * through the series combination of resistor 42 and capacitor 44 (relay 22 is open), and communicates this event to microcontroller 20 through a modem control line COM. Microcontroller 20 interprets this DTMF sequence as a request to begin a receive operation and initiates a receive handshaking routine by sending a receive initialize string to modem 30 through data bus 38. Alternatively, microcontroller 20 begins a receive operation when it detects the RECV key pressed.

Two modes of operation are possible in modem 30: a command mode, and a data mode. Before handshaking with the remote modem is completed, modem 30 is in command mode and any data received from microcontroller 20 through bus 38 is interpreted as a command. For example, string ATD instructs modem 30 to go off-hook and dial DTMF digits . After handshaking is complete, the modem switches to data mode and any data sent to modem 30 by microcontroller 20 is interpreted as data to be transmitted to the remote modem. To control data flow, modem 30 provides microcontroller 20 with a Clear-To-Send (CTS) control that indicates when the next data byte can be loaded from the microcontroller to the internal transmit register of modem 30 for transmission to the remote modem. The modem also provides microcontroller 20 with a Carrier-Detect (CD) signal that indicates if a data carrier is present and data communication with a remote modem is in progress.

During handshaking, the modems automatically negotiate communication data speed (normally 14.4 kb/s), error control protocol (normally V.42), and data compression protocol (normally V.42 bis), based on telephone line conditions. Handshaking is completed simultaneously at both the transmitting modem and the receiving modem in approximately ten seconds, and data communication between the two modems is established. Modem control CD indicates to microcontroller 20 when data transmission can begin.

At the transmitter end, microcontroller 20 detects that handshaking is complete and sends one clock pulse to video control line TRANSMIT to initialize video processor 10 for data transmission. Control line VIDEO/DATA goes LOW to indicate that video processor 10 is ready to transmit data. Microcontroller 20 now can read data (on bus 38) from video processor 10 by sending lock pulses to video control line STROBE , and transfer data to modem 30 (through bus 38) by sending clock pulses to modem control line MDLOAD. Microcontroller 20 processes the data from video processor 10 before loading it to modem 30, as will be described below. Control VIDEO/DATA remains LOW until all data relating to one video image is transferred from video processor 10 to modem 30.

At the receiver end, microcontroller 20 detects that handshaking is complete and sends one clock pulse to video control line RECEIVE to initialize video processor 10 for data reception. Control line VIDEO/DATA goes LOW to indicate that video processor 10 is ready to receive data. Microcontroller 20 now can read data (on bus 38) from modem 30 by sending clock pulses to modem control line MDLOAD, and write data to video processor 10 (through bus 38) by sending clock pulses to video control line STROBE. Microcontroller 20 processes the data received from modem 30 before sending it to video processor 10, as will be described below. Control VIDEO/DATA remains LOW until all data relating to one video image is transferred from modem 30 to video processor 10.

At the transmitter end, microcontroller 20 reads digital data from video processor 10 and processes the data depending on whether high or low resolution transmission is selected (by pressing the SEND HI or SEND LO key, respectively). If high-resolution transmission is selected, microcontroller 20 reads data from video processor 10 and processes this data by setting the two least significant bits of each byte to logic LOW. The resulting byte, referred to as a high-resolution byte, contains only six significant bits and is more compressible than the original byte during transmission (which shortens the transmission time of a video image). Microcontroller 20 then transfers the high-resolution bytes to modem 30, which sends the data to the receiving modem. If low-resolution transmission is selected, microcontroller 20 reads data from video processor 10 and processes this data by stripping off the lower nibble (four least significant bits) of each byte, then combining in a specified order the upper nibbles of two consecutive bytes into one single byte. This byte, referred to as a low-resolution byte, contains actually two bytes of lower resolution. Microcontroller 20 then transfers the low-resolution bytes to modem 30, which sends the data to the receiving modem.

The resolution of a transmission must be communicated to the receiver end before data transfer begins, to allow the microcontroller to process incoming data accordingly. If low-resolution transmission is selected, the transmitter end sends a control byte to the receiver end as the first byte after handshaking. This control byte has the least significant bit HIGH, and preferably has a value of HEX 01. If the first incoming byte at the receiver end is HEX 01, microcontroller 20 recognizes that a low-resolution transmission was selected and interprets the incoming data as low-resolution bytes. Control byte HEX 01 is discarded (not a data byte). If HEX 01 is not detected as the first incoming byte, microcontroller 20 will assume that high-resolution transmission was selected (default). Because in high-resolution transmission the least significant bit of the outgoing data is always at logic LOW, it is never possible to send byte HEX 01 as data during a high-resolution transmission and cause the receiver end to interpret the start of a low-resolution transmission. Therefore, the method is reliable.

At the receiver end, microcontroller 20 reads the incoming data from modem 30, and processes this data depending on whether high or low resolution transmission is detected. In high-resolution transmission, microcontroller 20 receives high-resolution bytes from modem 30 and loads this data directly to video processor 10. In low-resolution transmission, microcontroller 20 receives low-resolution bytes from modem 30, and converts each byte into two bytes having the lower nibble reset to LOW. These bytes are then written to the memory of video processor 10 in two consecutive addresses in a specified order.

When all data relating to a video image is transferred from the transmitter end to the receiver end, video control line VIDEO/DATA at both ends reverts to HIGH and indicates to microcontroller 20 that the video image transmission is complete. Microcontroller 20 then switches relay 22 off (using RELAY control 36) and disconnects modem 30 from the telephone line, resuming the connection between the telephone set and the telephone line for voice communication. The video image received is now displayed at the receiver end with virtually no degradation for high-resolution transmission (even though only six significant bits are used, rather than eight), and a reasonable degree of degradation for low-resolution transmission (only four significant bits are used).

If the user at the transmitter or receiver end aborts a video image transmission by pressing the STOP key before data transfer is complete, microcontroller 20 at the other end detects a carrier loss from modem control line CD, and immediately switches relay 22 off (without waiting for video control line VIDEO/DATA to go HIGH). Microcontroller 20 then resets video processor 10 and modem 30 at the same time using RESET control line 156, which causes video processor 10 to switch to video display mode (VIDEO/DATA control goes HIGH and the image stored in RAM is displayed) and modem 30 to be ready for the next transmission. Carrier loss detection signal CD is essential to assure that both the transmitter and receiver units are reset simultaneously, regardless of which side aborts the transmission.

Operation of FIGS. 4A and 4B—Video Processor

The operation of video processor 10 will be described with reference to FIG. 4A. When the GRAB key is pressed and held down, DTC 64 detects a HIGH level at the GRAB input 96 and sets control ADE 154 to enable the output of A/D 48. In this state, a video signal received at VIDEO IN 12 is converted by A/D 48 into digital samples at a sampling rate determined by the frequency of CLK 66. A/D 48 includes an AGC and clamp circuit which adjusts the amplitude of the input signal so that the lowest voltage level of the video signal is converted to HEX 00 (decimal 0), and the highest voltage level to HEX FF (decimal 255). This adjustment is necessary to utilize the full dynamic range of the A/D converter and assure that the the video signal is always within the A/D converter range (so that the signal is never clipped and the conversion is linear). At the rising edge of clock 66, converted digital samples are loaded from A/D output port 72 to input port 74 of D/A 50 (through bus 60). At the falling edge of clock 66, D/A 50 converts the digital samples back to an analog video signal and outputs this reconstructed signal to VIDEO OUT 14. The output signal is displayed on TV monitor 106 (see FIG. 1A) as a digitized motion picture having quality virtually identical to that of a stored image.

On the rising edge of CLK 66, digital samples are also transferred from output port 72 of A/D 48 to port A of buffer 52. Buffer 52 is normally enabled by control VIDEO/DATA 128, and the direction of flow is selected by control ADE 154 so that data is transferred from port A to port B when A/D 48 is enabled. Digital samples received on port B of buffer 52 are transferred through bus 58 to port 76 of RAM 56. Buffer 54 is normally disabled by control VIDEO/DATA 128, which isolates high-speed bus 58 from low-speed bus 38. For as long as GRAB input 96 remains HIGH (the GRAB key is pressed), DTC 64 holds all RAM address lines 62 to logic LOW and sets READ/WRITE control 130 of RAM 56 to logic LOW, so that RAM 56 is in write mode.

When GRAB input 96 goes LOW (the GRAB key is released), DTC 64 waits for a vertical synchronization (sync) pulse, i.e., the start of a video frame, on the video input signal and then begins storing the frame. In the preferred embodiment, DTC 64 detects the vertical sync pulse by monitoring the analog video input signal directly at VIDEO IN 12. In an alternative configuration of the video processor (not shown), DTC 64 detects the vertical sync pulse digitally by monitoring the converted digital samples of the video signal at the output of the A/D converter. This approach is more cost-effective if a custom ASIC is used for the implementation of DTC 64.

When a vertical sync pulse is detected, DTC 64 begins to increment RAM address 62 synchronously with clock 66, so that digital samples converted by A/D 48 are written to address locations of RAM 56 in sequential order. DTC 64 increments RAM address 62 up to a maximum count, so that only a predetermined number of digital samples of a video frame is written to RAM 56. For an NTSC video signal, the predetermined number of digital samples corresponds to a video frame length of approximately 262.5 lines, which is only one-half the length of a full video frame (525 lines).

When RAM address 62 reaches maximum count, DTC 64 disables A/D 48 using control ADE 154, sets RAM 56 in read mode by setting READ/WRITE 130 to logic HIGH, and resets all RAM address lines 62 to logic LOW (start address). Control ADE 154 simultaneously reverses the data flow direction of buffer 52, so that data can be transferred from port B to port A. DTC 64 then starts incrementing RAM address 62 synchronously with CLK 66, and data stored in RAM 56 is transferred through buffer 52 to D/A 50, which converts the data into an analog video signal at VIDEO OUT 14. DTC 64 increments RAM address 62 up to the predetermined maximum count, then resets the RAM address to logic LOW, increments the RAM address again to the maximum count, and so on in an endless loop, as a ring counter. Because data stored in RAM 56 is the digital representation of a video frame, the continuous conversion of such data by D/A 50 at VIDEO OUT 14 is displayed in TV monitor 106 (FIG. 1A) as a still video image.

If the SEND HI or SEND LO key is pressed, microcontroller 20 initializes video processor 10 for data transmission by sending one clock pulse to TRANSMIT input 98 of DTC 64. As a result, DTC 64 disables buffer 52 and enables buffer 54 using control VIDEO/DATA 128, sets RAM 56 in read mode using control READ/WRITE 130, and resets RAM address 62 to the start address (all lines at logic LOW). Control READ/WRITE 130 also sets the direction of buffer 54 so that data can be transferred from port C on bus 58 to port D on bus 38. In this state, DTC 64 increments RAM address 62 and controls the transfer of data from RAM 56 to bus 58 synchronously with STROBE input 94, rather than with CLK 66. Microcontroller 20 sends clock pulses to STROBE 94 and reads one byte of data at a time from RAM 54 through buffer 54. RAM address 62 increments by one count for every byte transferred.

As data is transferred from RAM 56 to microcontroller 20, A/D 48 is enabled by control ADE 154 and digitizes the video source signal from VIDEO IN 12. Digital samples are transferred to D/A 50 through bus 60 at the sampling rate of CLK 66 (bus 60 is isolated from bus 58 by buffer 52), and D/A 50 reconstructs the analog video source signal at VIDEO OUT 14. During transmission of an image, TV 106 displays the video source signal from VIDEO IN 12, rather than the image stored in RAM 56.

When RAM address 62 reaches maximum count, the last byte stored in RAM 56 is transferred to microcontroller 20, and control VIDEO/DATA 128 reenables buffer 52 and disables buffer 54. Control ADE 154 disables A/D 48 and sets the direction of data flow in buffer 52 from RAM 56 to D/A converter 50, so that the frame stored in RAM 56 is again reconstructed as an analog video signal at VIDEO OUT 14 and displayed on TV 106 as a still video image.

In an alternative configuration, microcontroller 20 can be provided with a digital memory of the same size as RAM 56. In this configuration, it is possible to copy the data from RAM 56 to the microcontroller's memory in a very short time (less than 20 ms, for example), and then transmit the data from the microcontroller's memory to modem 30 at the relatively slow speed allowed by the modem. In this case, the image stored in RAM 56 can be displayed continuously on TV 106 while the same data is being transmitted from the microcontroller's memory to the modem, and the user perceives only a short glitch in the display of the image at the start of the transmission when data is copied from RAM 56 to the memory of microcontroller 20. This configuration, however, requires twice the amount of memory as the preferred configuration, and a more complex and costly microcontroller.

If the RECV key is pressed or DTMF sequence ** is detected, microcontroller 20 initializes video processor 10 for data reception by sending one dock pulse to RECEIVE input 120 of DTC 64. As a result, DTC 64 disables buffer 52 and enables buffer 54 using control VIDEO/DATA 128, sets RAM 56 in write mode using control READ/WRITE 130, and resets RAM address 62 to the start address (all lines at logic LOW). Control READ/WRITE 130 also sets the direction of buffer 54 so that data can be transferred from port D on bus 38 to port C on bus 58. In this state, DTC 64 increments RAM address 62 and controls the transfer of data from bus 58 to RAM 56 synchronously with STROBE input 94, rather than with CLK 66. Microcontroller 20 sends clock pulses to STROBE 94 and writes one byte of data at a time to RAM 56 through buffer 54. RAM address 62 increments by one count for every byte transferred.

As data is transferred from microcontroller 20 to RAM 56, A/D 48 is enabled by control ADE 154 and digitizes the video source signal from VIDEO IN 12. Digital samples are transferred to D/A 50 through bus 60 at the sampling rate of CLK 66 (bus 60 is isolated from bus 58 by buffer 52), and D/A 50 reconstructs the analog video source signal at VIDEO OUT 14. During reception of an image, TV 106 displays the video source signal from VIDEO IN 12, rather than the image being stored in RAM 56.

When RAM address 62 reaches maximum count, the last byte from microcontroller 20 is written to RAM 56, and control VIDEO/DATA 128 reenables buffer 52 and disables buffer 54. Control ADE 154 disables A/D 48 and sets the direction of data flow in buffer 52 from RAM 56 to D/A converter 50, so that the new frame stored in RAM 56 is reconstructed as an analog video signal at VIDEO OUT 14 and displayed on TV 106 as a still video image.

In an alternative configuration, microcontroller 20 can be provided with a digital memory of the same size as RAM 56. In this configuration, it is possible to write all the data received from modem 30 to the microcontrollers memory at relatively slow speed, and then copy the data from the microcontroller's memory to RAM 56 in a very short time (less than 20 ms, for example). In this case, the image stored in RAM 56 can be displayed continuously on TV 106 while data is being loaded from modem 30 to the microcontrollers memory, and the user perceives only a short glitch in the display of the image when data is copied from the memory of microcontroller 20 to RAM 56 at the end of a transmission. This configuration, however, requires twice the amount of memory as the preferred configuration, and a more complex and costly microcontroller.

FIG. 4B shows an alternative configuration of video processor 10. When bus 58 is used by microcontroller 20 to read data from RAM 56, the video source signal from VIDEO IN 12 is bypassed by switch 68 to VIDEO OUT 14. In this configuration, buffer 52 is not required, but video buffer 70 must be added to select one of two outputs to drive VIDEO OUT 14, depending on the logic state of VIDEO/DATA 128. If VIDEO/DATA 128 is at logic HIGH (video mode), buffer 70 selects the output of D/A 50, whereas if VIDEO/DATA 128 is at logic LOW (data mode), buffer 70 selects the output of bypass switch 68.

Operation of FIG. 5—Digital Timing Circuit (DTC)

The operation of DTC 64 will be described now with reference to FIG. 5. In video mode, TRANSMIT signal 98 and RECEIVE signal 120 are normally LOW and cause the output of OR gate 116 to be LOW. V/D latch 126 holds control VIDEO/DATA 128 at logic HIGH, and MUX 86 selects VIDEO CLK 84 from crystal oscillator 82 to drive CLK line 66. Sync latch 124 is reset to LOW, and control END 90 of RAC 80 sends a positive pulse to OR gate 92 every time RAM address 62 reaches maximum count (approximately every 16.6 ms for NTSC video). Output 88 of OR gate 92 resets RAC 80 every time END 90 goes HIGH.

If GRAB signal 96 goes HIGH (GRAB key is pressed), sync latch 124 is set to HIGH and R/W latch 118 is reset to LOW. The output of sync latch 124 causes output 88 of OR gate 92 to go HIGH and reset all RAM address lines 62 of RAC 80 to logic LOW (start address). READ/WRITE 130 is LOW and sets RAM 56 in write mode. This state is maintained for as long as the GRAB key is pressed.

When GRAB signal 96 goes LOW (GRAB key is released), sync latch 124 and R/W latch 118 maintain their logic state, but are ready to change state if a positive dock edge is generated at VSYNC 112 and END 90, respectively. Video sync detector 122 monitors the video input signal at VIDEO IN 12 for the start of a vertical sync pulse. When this occurs, a positive clock edge is generated at VSYNC 112 which resets sync latch 124 and causes output 88 of OR gate 92 to go LOW. RAC 80 is no longer reset and begins to increment for every clock cycle of CLK 66. DTC 64 is now writing digital samples in consecutive memory locations of RAM 56.

When RAC 80 reaches maximum count (end address), END output 90 goes HIGH and causes output 88 of OR gate 92 to go HIGH, which resets RAC 80. At the same time, the positive edge of END 90 causes output READ/WRITE 130 to go HIGH, which sets RAM 56 in read mode. When RAC 80 is reset, END control 90 goes LOW, output 88 of OR gate 92 goes LOW, and RAC 80 starts to increment address lines 62 (with RAM 56 in read mode.) DTC 64 has just stored a predetermined number of digital samples in RAM 56 (up to the end address), and now automatically begins to read the digital samples back from RAM 56. When RAC 80 reaches maximum count, END control 90 resets RAC 80, then RAC 80 increments address lines 62 again until the maximum count, and so on in an endless loop (as a ring counter). After grabbing a video frame and storing it in RAM 56, DTC 14 has automatically switched from "recording" the frame into memory to repeatedly "playing" the frame out to D/A converter 50.

If a positive clock pulse is received at TRANSMIT 98 (indicating the start of a data transfer session from RAM 56 to microcontroller 20), the output of OR gate 116 resets RAC 80 (through output 88 of OR gate 92) and V/D latch 126. VIDEO/DATA control 128 goes LOW and causes MUX 86 to select STROBE data dock 94 to drive CLK line 66. The video processor is now in data transmit mode.

As clock pulses from microcontroller 20 (see FIG. 2) are received at STROBE 94, RAC 80 increments address lines 62. When RAC 80 reaches maximum count (all data from RAM 56 has been transferred to microcontroller 20), END control 90 goes HIGH and provides a positive edge to the clock input of V/D latch 126. Control VIDEO/DATA 128 is set HIGH, and MUX 86 selects VIDEO CLK 84 to drive CLK 66. The video processor is now back in video mode, and RAC 80 resumes normal operation at high-speed as a ring counter.

In summary, after all data representing a video image has been transferred from RAM 56 to microcontroller 20 (see FIG. 4A) at a clock rate determined by STROBE 94, DTC 64 automatically resumes "playback" of the video frame from RAM 56 to D/A converter 50 at a clock rate determined by VIDEO CLK 84. STROBE 94 is a low-frequency clock determined by the speed at which data can be transferred by the modem through the telephone line (modem speed), whereas VIDEO CLK 84 is a high-frequency clock determined by the sampling rate of the A/D converter (8 Mhz, in the present discussion).

If a positive clock pulse is received at RECEIVE 120 (indicating the start of a data transfer session from microcontroller 20 to RAM 56), the output of OR gate 116 resets RAC 80 (through output 88 of OR gate 92) and V/D latch 126. The output of OR gate 114 resets R/W latch 118. VIDEO/DATA control 128 goes LOW and causes MUX 86 to select STROBE data dock 94 to drive CLK line 66, and READ/WRITE control 130 goes LOW and sets RAM 56 in write mode. The video processor is now in data receive mode.

As clock pulses from microcontroller 20 are received at STROBE 94, RAC 80 increments address lines 62. When RAC 80 reaches maximum count (all data relating to a video image has been received from microcontroller 20), END control 90 goes HIGH and provides a positive edge to the clock inputs of both V/D latch 126 and R/W latch 118. Control VIDEO/DATA 128 is set HIGH, and MUX 86 selects VIDEO CLK 84 to drive CLK 66. Control READ/WRITE 130 is set HIGH and sets RAM 56 in read mode. The video processor is now back in video mode, and RAC 80 resumes normal operation at high-speed as a ring counter.

In summary, after all data representing a video image has been received from microcontroller 20 to RAM 56 at a dock rate determined by the modem speed (STROBE 94), DTC 64 automatically "plays back" the new data stored in RAM 56 to D/A converter 50 at the sampling rate of the A/D converter (VIDEO CLK 84).

If a positive clock pulse is received at RESET 156 (to abort a transmit or receive data transfer session), both V/D latch 126 and R/W latch 118 are asynchronously set regardless of the state of END 90. Control VIDEO/DATA 128 is set HIGH, and MUX 86 selects VIDEO CLK 84 to drive CLK 66. Control READ/WRITE 130 is set HIGH and sets RAM 56 in read mode. In this case, the video processor is switched back to video mode before RAC 80 reaches maximum count, and RAC 80 resumes normal operation at high-speed as a ring counter.

Output ADE 154 of NAND gate 158 controls A/D converter 48 (see FIG. 4A). When the video processor is in data transmit or receive mode, VIDEO/DATA 128 is LOW, ADE 154 goes HIGH, and A/D converter 48 is enabled. When a video image is grabbed, READ/WRITE 130 is LOW (RAM 56 is in write mode), ADE 154 goes HIGH, and A/D converter 48 is enabled.

PICTURE control 78 determines the starting count of RAM address lines 62 when RAC 80 is reset. The effect and operation of such mechanism, along with the operation of RAC 80, will be described below with reference to FIG. 6A.

Operation of FIG. 6A—RAM Address Control (RAC) with Picture Adjust

PICTURE adjustment 78 is very effective to correct color imperfections observed in the still video image as a result of "stitching" of adjacent video frames in the video signal. The video frame stored in RAM is repeatedly played back to the D/A converter to reconstruct an analog video signal composed of a succession of identical video frames, but the end of a video frame is not necessarily continuous with the beginning of the next frame. PICTURE control 78 can correct minor timing imperfections in the frame length and make "stitching" of two consecutive frames continuous. In the preferred embodiment, "stitching" of adjacent video frames is especially critical because only one half the number of lines contained in a video frame is stored in the digital memory.

In the NTSC system, for example, 30 video frames per second are displayed in a motion picture, each frame consisting of 525 lines. The picture information of one video frame is contained in 525 lines, but two interlaced vertical passes, one odd and one even, are necessary to display the full resolution content of the video frame on a TV monitor. A vertical pass refreshes the TV monitor 60 times per second and displays only 262.5 lines.

In the preferred embodiment, the digital memory stores only 262.5 lines of a video frame (one vertical pass, odd or even). Such lines are then interlaced during "play back" of the data from the digital memory to the D/A converter, and compose one video frame on the TV monitor. The resulting still video image contains only 50% the information content of the original video frame from the video source, but appears virtually identical.

Because two identical vertical passes are interlaced to compose one video frame (the interlaced vertical passes in a TV monitor should be different, one even and one odd), there can be a signal discontinuity in the video signal reconstructed by the D/A converter when data at the end address of the digital memory is "stitched" to data at the start address of the digital memory. The purpose of PICTURE control 78 is to adjust the "play back" timing slightly to minimize this "stitching" effect. Generally, once an appropriate setting of PICTURE control has been found for a given signal source, it will not be necessary to readjust it. It is possible to use a timing detector circuit to automatically adjust the PICTURE control, without manual user intervention. Such a detector, however, would add cost to the implementation of the video processor.

If a positive clock pulse is received at PICTURE 78 (the PICTURE key is pressed once), ripple counter 132 increments by one count. The four-bit output of ripple counter 132 can be set in steps anywhere between HEX 0 and F, and remains fixed until another clock pulse is received at PICTURE 78.

When CLEAR control 88 goes HIGH (RAC 80 is reset), synchronous counter 134A loads the digital outputs of ripple counter 132 to address lines 62A, and synchronous counter 134B is reset (all outputs are reset to LOW). As a result, the start address of synchronous counter 134 is determined by the output setting of ripple counter 132 and can have as many as 16 different values (all possible combinations of address lines 62A). By pressing the PICTURE key, ripple counter 132 is incremented and the length of the stored video frame is adjusted in increments of the sampling rate period, up to 16 steps. Steering logic 138 determines the maximum count of synchronous counter 134 by monitoring address lines 62B, and sets END control 90 to logic HIGH when a predetermined count has been reached.

In data transmit or receive mode (VIDEO/DATA 128 at logic LOW), when data is transferred at low speed (modem speed) between RAM 56 and microcontroller 20, status logic 140 monitors the count of synchronous counter 134 and displays the percentage completion of the data transfer on status indicators 142. This feature is desirable because the user can monitor the progress of a video image transmission.

In video mode (VIDEO/DATA 128 at logic HIGH), status indicators 142 appear all lit when an image is "played back" (due to the high speed of counter 134, which operates as a ring counter), and all off when the GRAB key is held pressed (counter 134B is reset and address lines 62B are held at logic LOW).

Operation of FIG. 6B—RAM Address Control with Programmable Steering Logic

FIG. 6B is an alternative RAM address control configuration, which can be programmed by microcontroller 20 to have any start address (when reset) defined by ripple counter 146. The address loading mechanism from ripple counter 146 to synchronous counter 148 is identical to that described in FIG. 6A for ripple counter 132 and synchronous counter 134A, except that ripple counter 146 now has the same size as synchronous counter 148 (eighteen bits). END control 90 goes HIGH when synchronous counter 148 is full (all address lines 62 are at logic HIGH), which is detected by the FULL output of counter 148 without the need for a steering logic.

This configuration allows microcontroller 20 to program the timing length of the video frame to be stored in the RAM by simply storing a predetermined starting address for the RAM in counter 146. Microcontroller 20 can store an arbitrary address in counter 146 by using RSET control 144 to reset the counter, and PICTURE control 78 to clock a predetermined number of pulses. When CLEAR signal 88 goes HIGH (RAM 56 is reset), the output setting of ripple counter 146 is loaded to the output of synchronous counter 148, and the start address of lines 62 becomes the setting specified in counter 146. END signal 90 goes HIGH when counter 148 is FULL. The timing length of one frame is the difference between the total number of RAM addresses (the size of the RAM) and the starting address of the RAM stored in counter 146, multiplied by the period of the sampling rate.

Microcontroller 20 can also make picture adjustments in the video processor to correct the "stitching" effect, by changing the setting of the least significant four bits in counter 146 in response to a press of the PICTURE key by the user.

Figure 7:
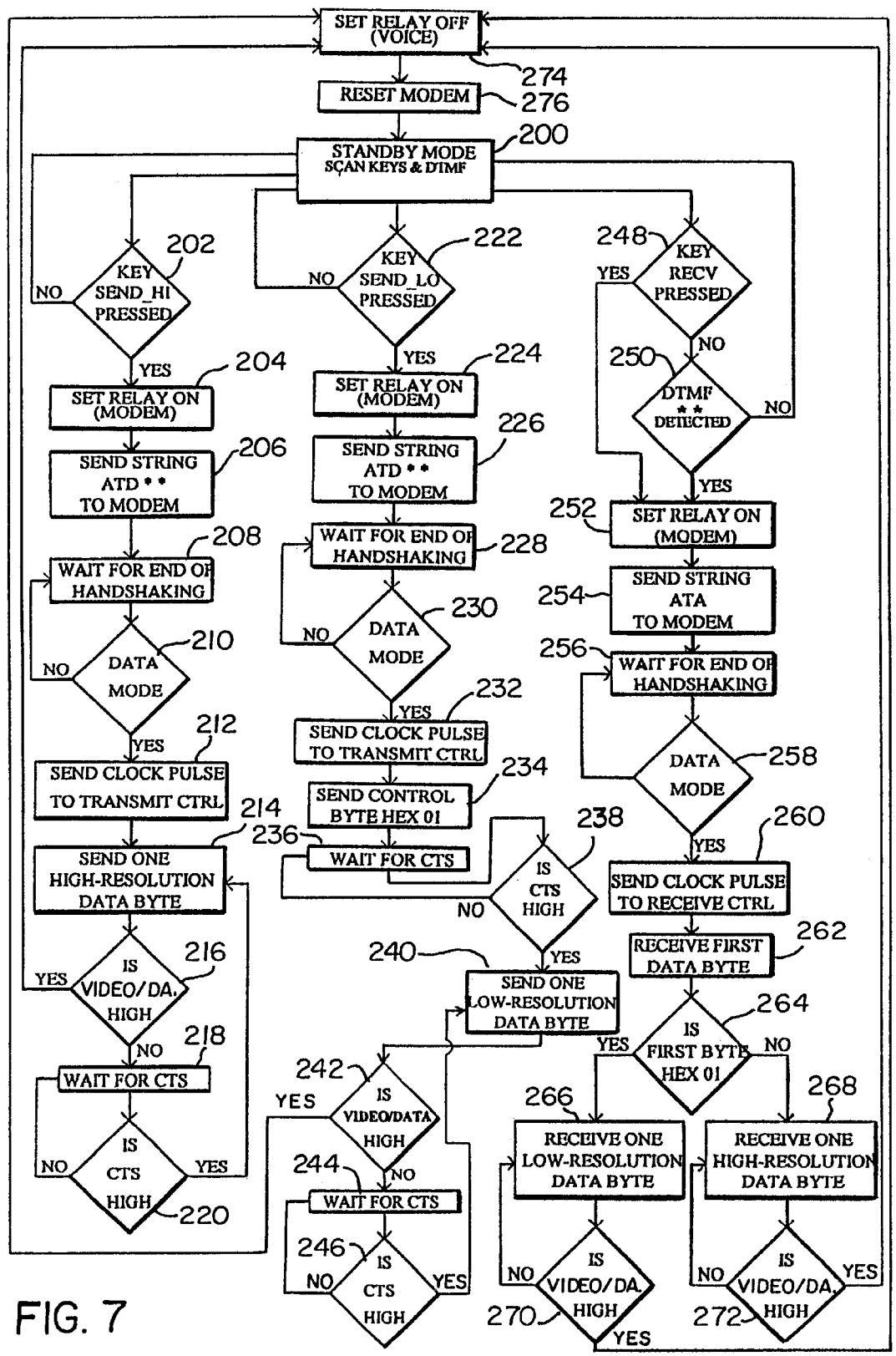
FIG. 7 shows a send and receive operation flowchart of the videofax.

Operation of FIG. 7—Send and Receive Operation Flowchart

FIG. 7 shows a top-level operational flow of the microcontroller for send and receive functions (see also FIG. 2).

In standby mode (block 200), the microcontroller scans the SEND HI, SEND LO, and RECV keys and monitors the DTMF detector for a * * sequence (equivalent to the press of the RECV key).

If the SEND HI key is pressed (YES from block 202), the microcontroller sets the relay on for modem communication (block 204), sends transmit initialization string ATD** to the modem (block 206), and waits for handshaking with the receiving modem to be completed (block 208). When handshaking is complete, the modem switches to data mode (YES from block 210). The microcontroller now initializes the video processor for data transmission with a positive dock pulse to the TRANSMIT control (block 212), and sends one high-resolution data byte to the modem (block 214). The CTS control of the modem goes LOW (NO from block 220) until the byte is transmitted to the receiving modem, and the microcontroller waits for CTS to go HIGH (block 218) before sending the next byte (YES from block 220). Data is sent to the modem for as long as the VIDEO/DATA control of the video processor is LOW (NO from block 216), which indicates that the digital memory has not reached maximum count and more data of the video image is available to be transmitted. When control VIDEO/DATA goes HIGH (YES from block 216), the microcontroller sets the relay off for voice communication (block 274), resets the modem (block 276), and returns to standby mode (block 200).

If the SEND LO key is pressed (block 222), the microcontroller sets the relay on for modem communication (block 224), sends transmit initialization string ATD** to the modem (block 226), and waits for handshaking with the receiving modem to be completed (block 228). When handshaking is complete, the modem switches to data mode (YES from block 230). The microcontroller now initializes the video processor for data transmission with a positive clock pulse to the TRANSMIT control (block 232), and sends control byte HEX 01 to the modem as the first data byte (block 234). This byte is transmitted to the receiving modem to signal the start of a low-resolution transmission. The microcontroller waits for CTS control to go HIGH (block 236), and then (YES from block 238) sends one low-resolution data byte to the modem (block 240). The CTS control of the modem goes LOW (NO from block 246) until the byte is transmitted to the receiving modem, and the microcontroller waits for CTS to go HIGH (block 244) before sending the next byte (YES from block 246). Data is sent to the modem for as long as the VIDEO/DATA control of the video processor is LOW (NO from block 242), which indicates that the digital memory has not reached maximum count and more data of the video image is available to be transmitted. When control VIDEO/DATA goes HIGH (YES from block 242), the microcontroller sets the relay off for voice communication (block 274), resets the modem (block 276), and returns to standby mode (block 200).

If the RECV key is pressed (YES from block 248) or the DTMF sequence * * sent by the transmitting modem is detected (YES from block 250), the microcontroller sets the relay on for modem communication (block 252), sends receive initialization string ATA to the modem (block 254), and waits for handshaking with the transmitting modem to be completed (block 256). When handshaking is complete, the modem switches to data mode (YES from block 258). The microcontroller now initializes the video processor for data reception with a positive dock pulse to the RECEIVE control (block 260), and receives the first data byte from the modem (block 262). If this byte is HEX 01 (YES from block 264), the microcontroller assumes that a low-resolution image transmission has been initiated and interprets the subsequent data bytes received from the modem as low-resolution data bytes (block 266). If the first data byte is not HEX 01 (NO from block 264), the microcontroller assumes by default that a high-resolution image transmission has been initiated and interprets the subsequent data bytes received from the modem as high-resolution data bytes (block 268). Data bytes received from the modem are processed in the microcontroller and stored in the video processor memory for as long as control VIDEO/DATA of the video processor is LOW (NO from block 270 or 272, respectively). When control VIDEO/DATA goes HIGH (YES from block 270 or 272, respectively), which indicates that all data relating to a video image has been received, the microcontroller sets the relay off for voice communication (block 274), resets the modem (block 276), and returns to standby mode (block 200).

If at any point in the operational flow the STOP key or a loss of carrier (control CD) is detected, the microcontroller sets the relay off for voice communication (block 274), resets the modem (block 276), and returns to standby mode (block 200). For simplicity, the STOP key and carrier detect (CD) functions are not shown in the flowchart of FIG. 7.

Figure 8:
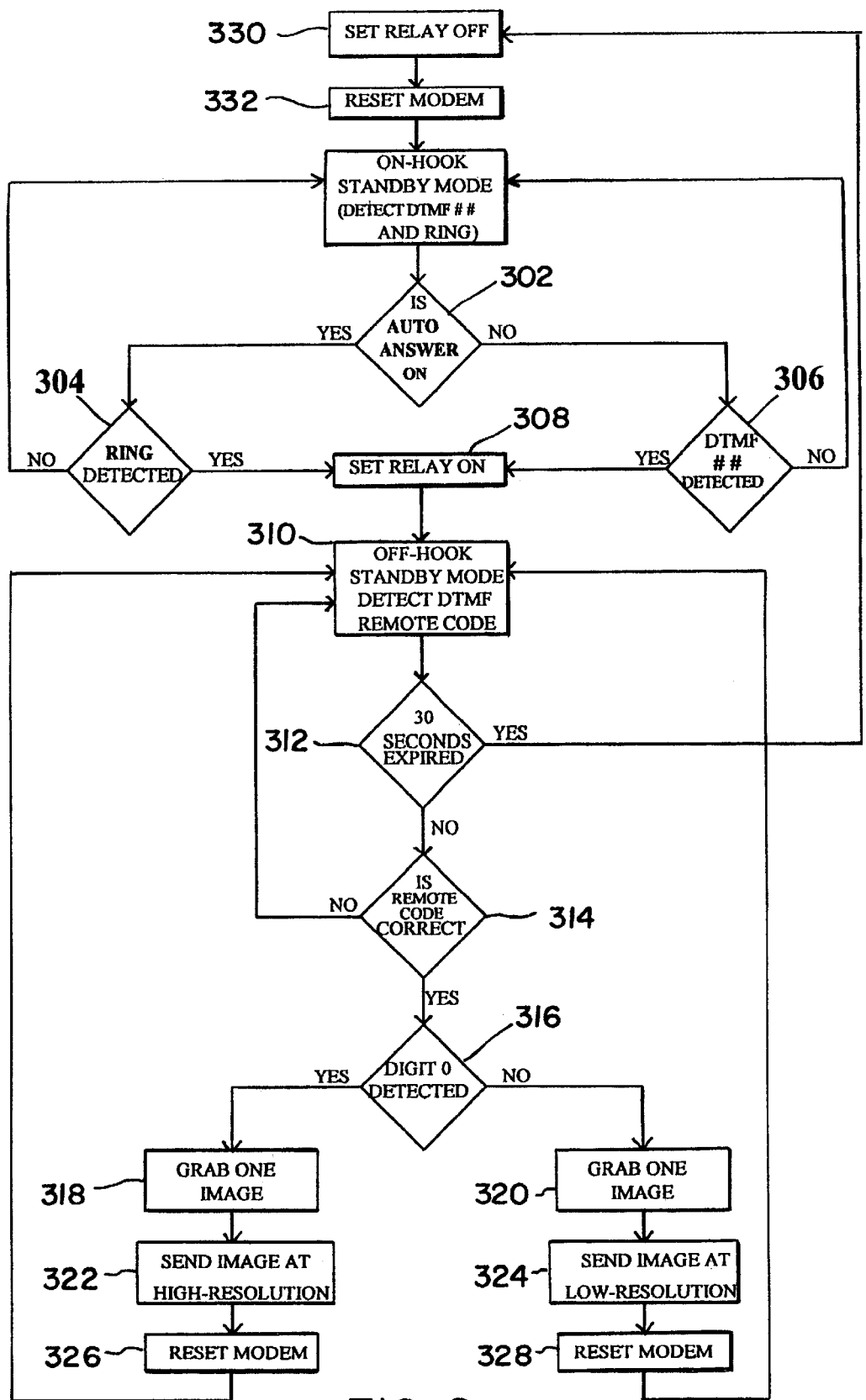
FIG. 8 shows a remote operation flowchart of the videofax.

Operation of FIG. 8—Remote Operation Flowchart

FIG. 8 shows a top-level operational flow of the microcontroller for remote mode functions. The user can set the videofax in remote mode when they desire to control the operation of the videofax from a remote location using DTMF signals. In the preferred embodiment, the user sets the videofax in remote mode by holding the POWER key pressed for three seconds or more when turning on the unit.

In remote mode, the microcontroller ignores the SEND HI, SEND LO, and RECV keys, and the detection of DTMF sequence * * . Two standby states are defined: on-hook when the relay is off, and of top-hook when the relay is on. If the videofax is on-hook (block 300) and the Auto Answer switch is set to ON (YES from block 302), the microcontroller monitors the telephone line for incoming ring signals (block 304). If the videofax is on-hook (block 300) and the Auto Answer switch is set to OFF (NO from block 302), the microcontroller monitors the DTMF detector for the sequence ## (block 306).

If two rings or two pound (DTMF signals are detected (YES form block 304 or 306, respectively), the microcontroller sets the relay on (block 308) and goes to off-hook standby mode (block 310). In this mode, the microcontroller waits for 30 seconds (NO from block 312) to receive a valid DTMF sequence corresponding to a user password (NO from block 314). The password can be preset by the user using the keys on the videofax and following a simple procedure (not shown). If the user does not preset a password, the microcontroller defaults to a factory predefined password (1111, for example).

If a valid password is not detected within 30 seconds from the time the relay is switched on (YES from block 312), the microcontroller sets the relay off (block 330), resets the modem (block 332), and returns to on-hook standby mode (block 300). If a valid password is detected within 30 seconds from the time the relay is switched on (YES from block 314), the microcontroller automatically grabs a video image (blocks 318 or 320) and initiates a transmission at high or low resolution (block 322 or 324, respectively).

The default transmission is at low resolution (NO from block 316). If the user wishes to receive an image at high resolution (YES from block 316), they can add a predefined character, 0, for example, at the beginning of the DTMF sequence representing the password. If the password is 2134, for example, the user presses DTMF digits 2134 to receive a low-resolution image, and digits 02134 to receive a high-resolution image. Obviously character "0" cannot be part of the digits that form a valid password.

When transmission is complete, the microcontroller resets the modem (blocks 326 or 328) and returns to off-hook standby mode (block 310). If the user wishes to receive another image, they can enter the valid password again within 30 seconds (NO from block 312), without having to hang up the phone and place another call.

Conclusion, Ramifications, and Scope

The above description of the system illustrates numerous advantages of the videofax, and suggests many applications in telecommunication.

The videofax offers improved features over video conferencing systems of the prior art, at substantially reduced cost. The system uses low-cost, off-the-shelf parts readily available from multiple manufacturers, and simple software code that can be implemented by most inexpensive microcontrollers. As a result, a videofax unit can be manufactured today for less than $100, and sold to the public at retail for $199 or less.

The videofax is a self-contained system (except for a video source and TV monitor) that virtually any user can operate by following simple instructions. No PC is required. A video image is transmitted simply by pressing a button, and a telephone connection is never lost during transmission (the internal relay of the videofax switches to voice mode if the modem data carrier is lost). The user can also operate the videofax from a distance, using a standard remote control.

Another advantage of the videofax is that the video image to be transmitted can be carefully selected by the user, and transmitted at any time during a telephone conversation at the discretion of both users. Unlike video systems that grab and send images continuously, the videofax lets the user decide what images to send, and assures privacy during operation.

Still another advantage of the videofax is that video images can be retrieved from a remote location (where another videofax is located) using DTMF signals. Sometimes it is desirable to monitor a home or office for security or other purposes. Using a password, the user can automatically grab an image at the remote location and receive it on the TV monitor connected to the local videofax. The user can retrieve additional images by reentering the password, without having to hang up the phone and place another call. If additional memory is added to the videofax (as described above for an alternative configuration of the videofax), it is actually possible to retrieve video images from the remote location continuously every ten seconds or so, and store such images in a videotape for security purposes, for example.

Yet another advantage of the videofax is that the video processor circuit is compatible with virtually every color television system used in the world, like NTSC, PAL, and SECAM, for example. If the videofax is used in countries adopting different television color systems, the hardware architecture of the videofax actually remains unchanged (except for the telephone line interface). The only modifications, if any, required in the video processor are the sampling rate of the A/D conversion, and the timing of the digital timing circuit (steering logic of RAM address control). For example, the PAL system has a color subcarrier of 4.48 Mhz and a frame rate of 50 Hz. Therefore, the sampling rate of the video processor in the videofax should be at least 9 Mhz to avoid color aliasing, and the refresh rate of the digital timing circuit should be 50 Hz. A slightly larger number of digital samples would be generated in this case for each video frame, and a slightly larger digital memory would be required to store the frame.

A further advantage of the videofax is that the video processor can store a video image in about 128 kilobytes of standard static RAM, assuming an 8 MHz sampling rate and a 60 Hz frame rate (NTSC system), which is about one-half the amount of memory required of other digital video storage methods known in the prior art. The substantial difference in memory size over circuits of the prior art is due to the method of storing one-half the number of lines of a full frame in the memory, and then interlace such number of lines to display a full frame at half the resolution of a normal frame. The method is perfectly acceptable because the resolution of the video image that results is virtually indistinguishable from the resolution of a full video frame that requires twice as much memory.

A still further advantage of the videofax is the method of transmitting data representing the video image. In high-resolution transmission, reducing the width of digital samples from eight to six bits improves the speed of data transmission through the modem, without affecting the quality of the video image. As mentioned in the description of the system, the videofax relies on data compression protocols used by the modem to compress transmitted data, and a byte with six significant bits is obviously more compressible than a byte with eight significant bits. In low resolution transmission, reducing the width of digital samples from eight to four bits allows the microcontroller to combine two four-bit nibbles into one byte. This effectively reduces the number of bytes to be transmitted for a low-resolution video image from 128K to only 64K. Because the modem compression protocol can compress data up to a factor of 4 to 1 (V.42 bis), 64K bytes can be further compressed to as low as 16K bytes, and the transmission of an image can be completed in as low as nine seconds using a 14.4 kb/s modem ([128K×8]/14,400), or five seconds using a 28.8 kb/s modem. (Although a compression ratio of 4:1 can be achieved using V.42 bis, in practice the average compression ratio achieved is about 2:1 and an image transmission takes about 18 seconds using a 14.4 kb/s modem, and 9 seconds using a 28.8 kb/s modem.)

It is apparent from the above discussion that the videofax technology opens a new dimension in telecommunication. A system that allows easy communication of video images at reasonable cost was long overdue.

Although the above description contains several specific examples, other variations and ramifications are possible. For example, the videofax can be designed to transmit and receive digitized voice through the modem during voice communication, by means of a digital speech processor. In this configuration, handshaking takes place only at the beginning of a telephone connection, and the time required for handshaking (approximately 10 seconds) is eliminated each time an image is transmitted. This configuration is particularly suitable for modems that have digital speech processing capabilities, and are reliable enough to assure that a telephone connection is not easily lost during an extended session.

Another variation of the videofax is the addition of digital memory to the video processor circuit to allow for storage of multiple video images. A larger digital memory can be easily partitioned into memory blocks with adjacent addresses, and each block can store one video image. In this configuration, the user can store and retrieve a number of video images in different memory locations by pressing a user key provided for image selection. Also, in this configuration the videofax can be used as a "video mailbox" telephone answering device, to answer telephone calls automatically and allow callers to leave a video image as a message.

Finally, the videofax has the potential to communicate with a PC. Because the videofax uses a standard modem to communicate data over the telephone line, it is easily conceivable that any PC equipped with a standard modem is capable of communicating with the videofax A software program can be installed in the PC to interface with the modem of a videofax (over the telephone line) and allow transmission of video images from and to the PC. This characteristic has enormous implications in business, as the videofax can be used to support most computerized services to the general public, like home shopping, home banking, or computerized information systems, for example.

Therefore the full scope of the invention should be determined by the appended claims and their legal equivalents, and not only by the examples given.

What is claimed is:

1. A system for capturing, storing, and retrieving an analog composite video signal having a plurality of signal components, comprising:

an analog-to-digital converter for converting said analog composite video signal from a video source to digital composite video data at a specified video sampling rate, without first decomposing said analog composite video signal into its signal components;

a digital memory for storing said digital composite video data between a start address and an end address in sequential order, without first decomposing said digital composite video data into its signal components;

a digital counter having a plurality of logic elements for controlling the transfer and storage of said digital composite video data from said analog-to-digital converter to said digital memory sequentially at said video sampling rate;

a plurality of digital elements for steering said digital counter to a ring counter in which a last count corresponding to said end address of said digital memory is followed by a first count corresponding to said start address of the digital memory; and a digital interface for advancing said ring counter at an arbitrary speed, accessing said digital memory sequentially, and retrieving said digital composite video data.

2. The system of claim 1, further including a digital-to-analog converter means for accessing said digital memory through said digital interface at said video sampling rate, and converting said digital composite video data back to an analog composite video signal suitable for display on a monitor.

3. The system of claim 2, further including a control logic circuit for increasing and decreasing a count of said start address or a count of said end address of said ring counter in steps of at least one, so as to increase or decrease the total number of memory addresses accessed by said digital-to-analog converter means.

4. The system of claim 3, further including a video synchronization detector for detecting a vertical or horizontal synchronization pulse in said composite video signal, said digital counter being synchronized to store digital composite video data corresponding to said vertical or horizontal synchronization pulse at said start address location in the digital memory.

5. The system of claim 1, further including a microcontroller means for accessing said digital memory through said digital interface, retrieving said digital composite video data at an arbitrary speed controlled by said microcontoller means, and processing said digital composite video data to a signal suitable for display on a monitor.

6. The system of claim 1, further including a modem means for accessing said digital memory through said digital interface, retrieving said digital composite video data at an arbitrary speed controlled by said modem means, and transferring said digital composite video data to a remote system over a telecommunications channel.

7. A system for storing and displaying an analog composite video signal having a plurality of signal components, comprising:

a digital memory for storing digital composite video data representing said analog composite video signal between a start address and an end address in sequential order;

a digital-to-analog converter for converting said digital composite video data stored in said digital memory to said analog composite video signal for display on a monitor;

a digital counter having a plurality of logic elements for controlling the transfer of said digital composite video data from said digital memory to said digital-to-analog converter means sequentially at a video sampling rate;

a plurality of digital elements for steering said digital counter to a ring counter in which a last count corresponding to said end address of said digital memory is followed by a first count corresponding to said start address of the digital memory; and a digital interface for advancing said ring counter at an arbitrary speed and storing said digital composite video data in said digital memory sequentially.

8. The system of claim 7, further including a control logic circuit for increasing and decreasing a count of said start address or a count of said end address of said ring counter in steps of at least one, so as to increase or decrease the total number of memory addresses accessed by said digital-to-analog converter.

9. The system of claim 7, further including a plurality of digital elements for programming a start address and an end address of said ring counter and accessing different sections of said digital memory for storing or displaying multiple video frames.

10. The system of claim 7, further including a microcontroller for accessing said digital memory through said digital interface and storing said digital composite video data at an arbitrary speed controlled by said microcontroller, said microcontroller being arranged to convert video data into digital composite video data for display on a monitor.

11. The system of claim 7, further including a modem for accessing said digital memory through said digital interface and storing said digital composite video data at an arbitrary speed controlled by said modem means, said modem being arranged to receive data from a remote system over a telecommunications channel.

12. A method for capturing, storing, and retrieving an analog composite video signal having a plurality of signal components, comprising:

digitizing said analog composite video signal to a digital composite video by an analog-to-digital converting means at a specified video sampling rate, without first decomposing said analog composite video signal into its signal components;

storing said digitized composite video data in a digital storage means having a plurality of storage addresses, by advancing a storage address from a start address to an end address in sequential order, without first decomposing said digital composite video data into its signal components;

controlling the transfer of said digitized composite video from said analog-to-digital converting means to said digital storage means in sequential order by a digital counter means at said video sampling rate;

steering said digital counter means by a plurality of digital elements to a ring counter means in which a last count corresponding to said end address of said digital memory means is followed by a first count corresponding to said start address of the digital memory means; and advancing said ring counter means by a digital interface means at an arbitrary speed to access said digital memory means and retrieve said digital composite video data.

13. The method of claim 12, further including a digital-to-analog converting means for accessing said digital memory means through said digital interface means at said video sampling rate, and converting said digital composite video data back to an analog composite video signal suitable for display on a monitor.

14. The method of claim 13, further including control logic means for increasing and decreasing a count of said start address or a count of said end address of said ring counter means in steps of at least one, so as to increase or decrease the total number of memory addresses accessed by said digital-to-analog converter means.

15. The method of claim 14, further including a video synchronization means for detecting a vertical or horizontal video synchronization pulse in said composite video signal, said digital counter means being synchronized to store digital composite video data corresponding to said vertical or horizontal synchronization pulse at said start address location in said digital memory means.

16. The method of claim 12, further including a microcontroller means for accessing said digital memory means through said digital interface means, retrieving said digital composite video data at an arbitrary speed controlled by said microcontoller means, and processing said digital composite video data to a signal suitable for display on a monitor means.

17. The system of claim 12, further including a modem means for accessing said digital memory through said digital interface means, retrieving said digital composite video data at an arbitrary speed controlled by said modem means, and transferring said digital composite video data to a remote system over a telecommunications channel means.

18. A method for storing and displaying an analog composite video signal having a plurality of signal components, comprising:

storing digital composite video data representing said analog composite video signal in a digital storage means from a start address to an end address in sequential order;

converting said digital composite video data by a digital-to-analog converting means to said analog composite video signal for display on a monitor;

controlling the transfer of said digitized composite video data in sequential order from said digital storage means to said digital-to-analog converting means by a digital counter means having a plurality of logic elements;

steering said digital counter means by a plurality of digital control means to a ring counter means in which a last count corresponding to said end address of said digital memory means is followed by a first count corresponding to said start address of the digital memory means; and advancing said ring counter means by a digital interface means at an arbitrary speed to access said digital memory means and store said digital composite video data in said digital memory sequentially.

19. The method of claim 18, further including digital control means for increasing and decreasing a count of said start address or a count of said end address of said ring counter means in steps of at least one, so as to increase or decrease the total number of memory addresses accessed by said digital-to-analog converting means.

20. The method of claim 18, further including digital control means for programming a start address and an end address of said ring counter means and accessing different sections of said digital memory means for storing or displaying multiple video frames.

21. The method of claim 18, further including a microcontroller means for accessing said digital memory means through said digital interface means and storing said digital composite video data at an arbitrary speed controlled by said microcontoller means, said microcontroller means being arranged to convert video data into said digital composite video data for display on a monitor means.

22. The method of claim 18, further including a modem means for accessing said digital memory means through said digital interface means and storing said digital composite video data at an arbitrary speed controlled by said modem means, said modem means being arranged to receive data from a remote system over a telecommunications channel means.

* * * * *